United States Patent
Grant et al.

(10) Patent No.: US 10,198,074 B2
(45) Date of Patent: Feb. 5, 2019

(54) HAPTICALLY-ENABLED MODULAR PERIPHERAL DEVICE ASSEMBLY

(71) Applicant: Immersion Corporation, San Jose, CA (US)

(72) Inventors: Danny Grant, Laval (CA); William Rihn, San Jose, CA (US); Leonard Soskin, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 112 days.

(21) Appl. No.: 15/350,715

(22) Filed: Nov. 14, 2016

(65) Prior Publication Data
US 2017/0242486 A1    Aug. 24, 2017

Related U.S. Application Data

(60) Provisional application No. 62/297,087, filed on Feb. 18, 2016.

(51) Int. Cl.
*G06F 3/01* (2006.01)
*G06F 3/0338* (2013.01)
*G06F 3/0346* (2013.01)
*A63F 13/98* (2014.01)
*A63F 13/285* (2014.01)
(Continued)

(52) U.S. Cl.
CPC ............ *G06F 3/016* (2013.01); *A63F 13/211* (2014.09); *A63F 13/24* (2014.09); *A63F 13/285* (2014.09);
(Continued)

(58) Field of Classification Search
CPC ...... G06F 3/016; G06F 3/0346; G06F 3/0338; G06F 3/011; G06F 3/0414; G06F 3/014;
(Continued)

(56) References Cited

U.S. PATENT DOCUMENTS 6,004,134 A * 12/1999 Marcus .................. A63F 13/06
                                                                    345/161
6,422,941 B1 * 7/2002 Thorner ................. A63F 13/02
                                                                    273/148 B
(Continued)

FOREIGN PATENT DOCUMENTS

EP          2 784 634           10/2014
EP          2 784 634 A2        10/2014
WO          2010/032223          3/2010

OTHER PUBLICATIONS

Partial European Search Report issued in EP Application No. 17156497.4, dated May 9, 2017.
(Continued)

*Primary Examiner* — Darlene M Ritchie
(74) *Attorney, Agent, or Firm* — Medler Ferro Woodhouse & Mills PLLC

(57) ABSTRACT

A modular peripheral device assembly is disclosed. The assembly includes a handheld controller and an assembly base. The handheld controller includes a first haptic actuator configured to generate a haptic effect at the handheld controller. The assembly base includes an attachment component that is configured to be attachable to and detachable from the handheld controller, and a second haptic actuator configured to generate haptic a effect at the assembly base or at the handheld controller when it is attached to the attachment component. The assembly further includes a control unit configured to select, based on whether the handheld controller is attached to or detached from the assembly base, at least one of the first and second haptic actuators to generate a haptic effect.

17 Claims, 18 Drawing Sheets

(51) Int. Cl.
*A63F 13/24* (2014.01)
*A63F 13/211* (2014.01)
*A63F 13/428* (2014.01)
*A63F 13/92* (2014.01)
*G05G 9/047* (2006.01)

(52) U.S. Cl.
CPC .............. *A63F 13/98* (2014.09); *G05G 9/047* (2013.01); *G06F 3/011* (2013.01); *G06F 3/0338* (2013.01); *G06F 3/0346* (2013.01); *A63F 13/428* (2014.09); *A63F 13/92* (2014.09); *A63F 2250/121* (2013.01); *A63F 2250/52* (2013.01); *A63F 2300/8082* (2013.01); *G05G 2009/04703* (2013.01); *G05G 2009/04718* (2013.01); *G06F 2203/013* (2013.01); *G06F 2203/015* (2013.01)

(58) Field of Classification Search
CPC ...... G06F 3/0202; G06F 3/033; G06F 3/0383; G06F 2203/015; G06F 2203/013; G05G 9/047; G05G 2009/04703; G05G 2009/04711; G05G 2009/04714; G05G 2009/04718; A63F 13/24; A63F 13/211; A63F 13/285; A63F 13/428; A63F 13/92; A63F 13/98; A63F 2300/8082; A63F 2250/12; A63F 2250/52; A63F 2250/121
See application file for complete search history.

(56) References Cited

U.S. PATENT DOCUMENTS

| | | | |
|---|---|---|---|
| 8,430,753 B2 | 4/2013 | Ikeda et al. | |
| 8,821,284 B2 | 9/2014 | Jennings et al. | |
| 8,885,870 B2 | 11/2014 | Matsushita et al. | |
| 8,939,838 B2 | 1/2015 | Alten et al. | |
| 2006/0109251 A1 | 5/2006 | Kelly | |
| 2007/0273643 A1 | 11/2007 | Erez et al. | |
| 2009/0033624 A1* | 2/2009 | Rosenberg | A63F 13/06 345/161 |
| 2010/0160041 A1 | 6/2010 | Grant et al. | |
| 2011/0050405 A1 | 3/2011 | Hollis | |
| 2011/0105231 A1 | 5/2011 | Ambinder et al. | |
| 2011/0163957 A1* | 7/2011 | Jaouen | G05G 5/05 345/161 |
| 2014/0049475 A1* | 2/2014 | Argiro | G06F 3/041 345/172 |
| 2014/0253446 A1 | 9/2014 | Petersen | |
| 2014/0274398 A1* | 9/2014 | Grant | G06F 3/0338 463/37 |
| 2014/0347298 A1 | 11/2014 | Park et al. | |
| 2016/0353502 A1* | 12/2016 | Folske | H04W 8/005 |
| 2017/0004697 A1* | 1/2017 | Boerhout | G08B 21/18 |

OTHER PUBLICATIONS

Extended European Search Report issued in EP 17156597.4, dated Jul. 27, 2017.
Extended European Search Report issued in EP 17156488.3, dated Jun. 21, 2017.
Communication pursuant to Article 94(3) EPC dated Sep. 28, 2018 in European Patent Application No. 17 156 497.4—1216.
Communication pursuant to Article 94(3) EPC dated Sep. 28, 2018 in European Patent Application No. 17 156 788.3—1216.

* cited by examiner

Fig. 12: Additional embodiments

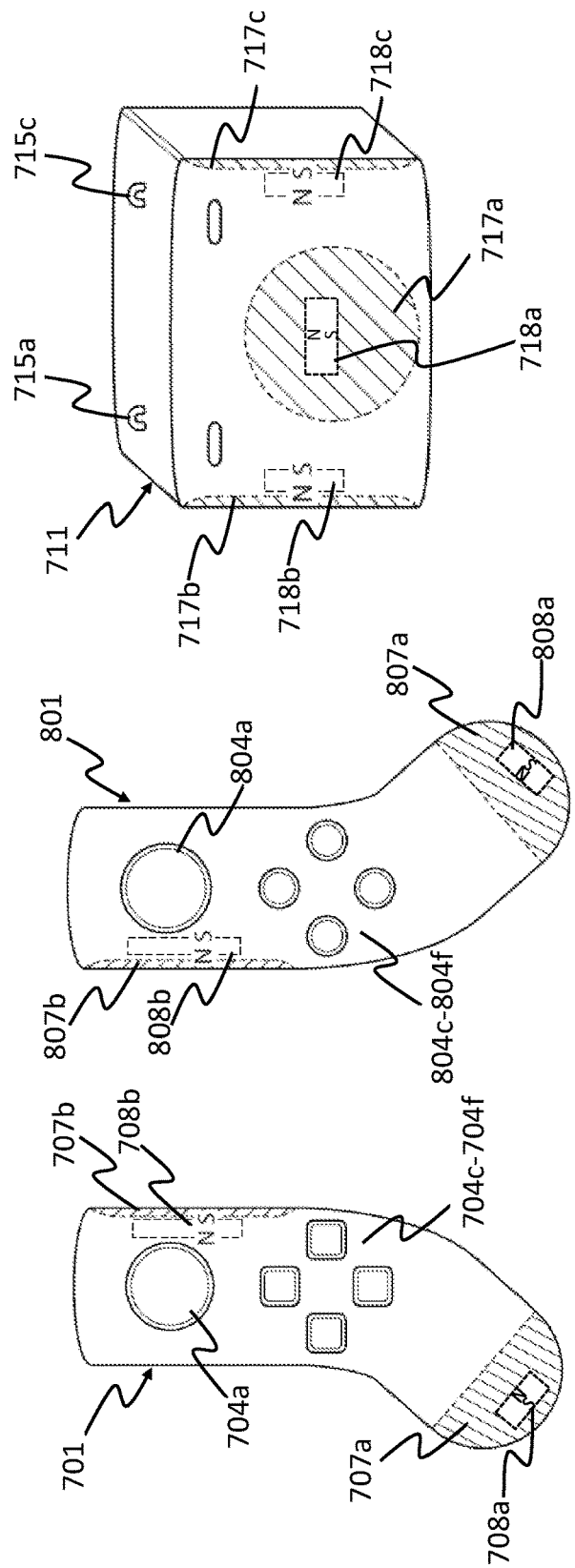

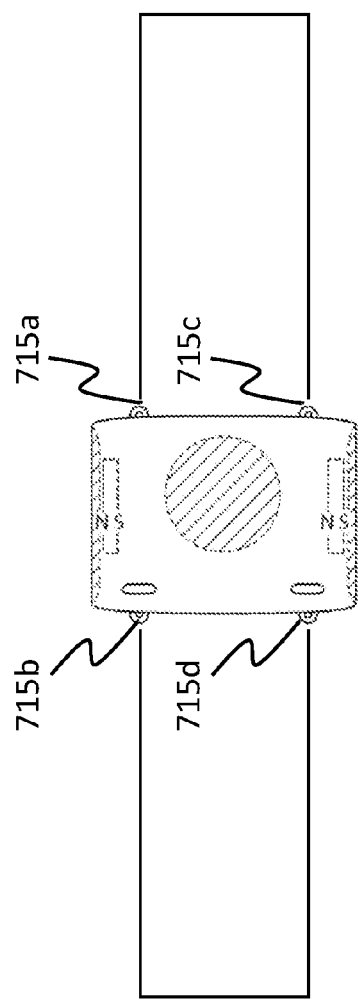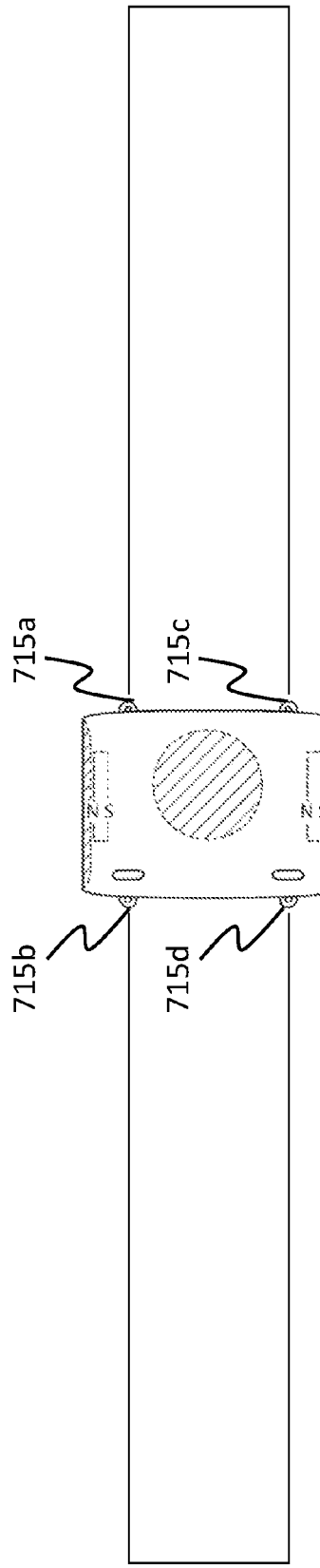

HAPTICALLY-ENABLED MODULAR PERIPHERAL DEVICE ASSEMBLY

CROSS REFERENCE TO RELATED APPLICATIONS

This application claims the benefit of U.S. Provisional Application No. 62/297,087, filed on Feb. 18, 2016, which is incorporated by reference herein in its entirety.

FIELD OF THE INVENTION

The present invention is directed to a haptically-enabled modular peripheral device assembly that has application in user interfaces, gaming, automotives, wearables, and consumer electronics.

BACKGROUND

Humans interface with electronic devices in a variety of applications, and the need for a more natural, easy-to-use, and informative interface device is a constant concern. Some applications involve interacting directly with computer-generated environments. Interface devices are used extensively with computer systems in the implementation of computer-controlled games, simulations, and other applications. A computer system such as a personal computer, home video game console, and portable computer can display a visual environment to a user on a display device. Users can interact with the displayed environment by inputting commands or data from the interface device. Popular interface devices include joysticks, mice, trackballs, styluses, tablets, pressure spheres, foot or hand pedals, or the like, that are connected to the computer system controlling the displayed environment. The computer updates the environment in response to the user's manipulation of a moved manipulandum, such as a joystick handle or mouse, and provides visual feedback to the user using the display screen.

In some interface devices, haptic (e.g., tactile and/or kinesthetic) feedback is also provided to the user. These types of interface devices can provide physical sensations to the user manipulating the interface device. For instance, motors or other actuators of the interface device are coupled to the manipulandum and are connected to the controlling computer system. The computer system receives sensor signals from the interface device and sends appropriate haptic control signals to the actuators in conjunction with host events. The actuators then provide forces on the manipulandum. The computer system can thus convey physical sensations to the user in conjunction with other visual and auditory feedback as the user is contacting the manipulandum. Commercially available interface devices with haptic feedback include the ForceFX joystick from CH Products, Inc.; the Wingman Force joystick and Wingman Formula Force steering wheel from Logitech, Inc.; and the Sidewinder Force Feedback Pro joystick from Microsoft Corporation.

SUMMARY

One aspect of the embodiments herein relate to a modular peripheral device assembly, comprising a handheld controller and an assembly base. The handheld controller is configured to sense at least one of motion and orientation of the handheld controller, and includes a user input component, a sensor configured to track at least one of motion and orientation of the handheld controller, and a first haptic actuator configured to generate a haptic effect at the handheld controller. The assembly base includes an attachment component that is configured to be attachable to and detachable from the handheld controller, and a second haptic actuator configured to generate a haptic effect for the assembly base or, when the handheld controller is attached to the attachment component, at the handheld controller. The modular peripheral device assembly further comprises a control unit located in at least one of the handheld controller and the assembly base, and configured to select, based on whether the handheld controller is attached to or detached from the assembly base, at least one of the first and second haptic actuators to generate a haptic effect, and configured to activate the selected at least one haptic actuator to generate the haptic effect.

In an embodiment, the attachment component is configured to be attachable to and detachable from an end of the handheld controller, and wherein the handheld controller is pivotable about the assembly base when attached thereto, such that the peripheral device assembly is operable as a joystick when the handheld controller is attached to the assembly base, and wherein the second haptic actuator, when activated, is configured to generate a haptic effect (e.g., kinesthetic haptic effect, vibrotactile haptic effect, or deformation-based haptic effect) on the joystick when the handheld controller is attached to the assembly base.

In an embodiment, the attachment component comprises a gimbal configured to provide at least two degrees of freedom, and the second haptic actuator is configured to exert a force or torque on the first handheld controller via the attachment component.

In an embodiment, the control unit is configured to select one or more haptic actuators from among only the first haptic actuator and any other haptic actuator of the handheld controller to generate the haptic effect in response to determining that the handheld controller is detached from the assembly base.

In an embodiment, the haptic effect is associated with an event in an application receiving input from the peripheral device assembly, and the control unit is configured to perform the selection of the at least one haptic actuator based on i) whether the handheld controller is attached to the assembly base and ii) a type of event in the application that the haptic effect is associated with.

In an embodiment, the control unit is configured to i) select the second haptic actuator in response to determining that the handheld controller is attached to the assembly base and that the haptic effect is associated with a first type of event in the application, and ii) select the first haptic actuator in response to determining that the handheld controller is attached to the assembly base and that the haptic effect is associated with a second type of event in the application.

In an embodiment, the control unit is configured to i) select one or more haptic actuators from among only the second haptic actuator and any other haptic actuator of the assembly base to generate the haptic effect in response to determining that the handheld controller is attached to the assembly base and that the haptic effect is associated with the first type of event in the application, and ii) select one or more haptic actuators from among only the first haptic actuator and any other haptic actuator of the handheld controller to generate the haptic effect in response to determining that the handheld controller is attached to the assembly base and that the haptic effect is associated with the second type of event in the application.

In an embodiment, in response to a determination that the handheld controller is attached to the assembly base, the control unit is configured to select the second haptic actuator to generate the haptic effect, and is configured to also select the first haptic actuator to generate the haptic effect if device profile information stored on the peripheral device assembly indicates that an output intensity of the first haptic actuator is less than a programmed threshold.

In an embodiment, in response to a determination that the handheld controller is attached to the assembly base, the control unit is configured to select the first haptic actuator and to select the second haptic actuator to generate the haptic effect, but is configured to delay activation of the first haptic actuator relative to activation of the second haptic actuator.

In an embodiment, the handheld controller is a first handheld controller, the assembly further comprising a second handheld controller having another attachment component that is attachable to and detachable from an opposite end of the first handheld controller, the second handheld controller further comprising a third haptic actuator.

In an embodiment, when the first handheld controller is attached to the assembly base and is not attached to the second handheld controller, the control unit is configured to activate the second haptic actuator with a first level of output intensity to generate the haptic effect.

In an embodiment, when the first handheld controller is attached to the assembly base and to the second handheld controller, the control unit is configured to activate the second haptic actuator with a second level of output intensity to generate the haptic effect or to activate the third haptic actuator with the second level of output intensity, the second level of output intensity being higher than the first level of output intensity.

In an embodiment, the first handheld controller is configured as a one-handed controller, and the second handheld controller is configured as a two-handed controller.

In an embodiment, when the first handheld controller is attached to the assembly base and is not attached to the second handheld controller, the control unit is configured to select the first haptic actuator, and to select no actuator of the second handheld controller to generate the haptic effect, and when the first handheld controller is attached to the assembly base and to the second handheld controller, the control unit is configured to select the third haptic actuator, and no actuator of the first handheld controller to generate the haptic effect.

In an embodiment, the attachment component of the assembly base includes a sleeve having a first groove and a ball extendable from the first groove, wherein the handheld controller has a second groove, and wherein the ball is configured to extend from the first groove to the second groove to lock the handheld controller to the assembly base when the two grooves are aligned.

In an embodiment, the assembly base includes a strap configured for attachment to a user's body.

In an embodiment, the assembly is configured to provide input to a virtual reality (VR) or augmented reality (AR) application. For example, the assembly may have spatial awareness tracking capability, such as that demonstrated in HTC Vive's room-scale VR system.

One aspect of the embodiments herein relates to a method of generating a haptic effect in a modular peripheral device assembly that includes i) a handheld controller configured to sense at least one of motion and orientation of the handheld controller and having a first haptic actuator configured to generate a haptic effect at the handheld controller, ii) an assembly base that is attachable to and detachable from the handheld controller and that has a second haptic actuator configured to generate a haptic effect at the assembly base or at the handheld controller when the handheld controller is attached to the assembly base, and iii) a control unit located in at least one of the handheld controller and the assembly base. The method comprises: the control unit determining that a haptic effect needs to be generated for an application receiving input from the peripheral device assembly; the control unit determining whether the handheld controller is attached to or detached from the assembly base; the control unit selecting at least one haptic actuator of the first haptic actuator and the second haptic actuator to generate the haptic effect, the selection based on whether the handheld controller is attached to or detached from the assembly base; and the control unit activating the selected at least one haptic actuator to generate the haptic effect.

In an embodiment, the selecting of the at least one haptic actuator is based on i) whether the handheld controller is attached to the assembly base and ii) a type of event in the application, from among at least a first type of event and a second type of event, that the haptic effect is associated with.

In an embodiment, the selecting of the at least one haptic actuator comprises selecting the second haptic actuator in response to determining that the handheld controller is attached to the assembly base and that the haptic effect is associated with a first type of event in the application.

In an embodiment, the selecting of the at least one actuator comprises selecting the first haptic actuator in response to determining that the handheld controller is attached to the assembly base and that the haptic effect is associated with a second type of event in the application.

One aspect of the embodiments herein relates to a modular peripheral device assembly, comprising a handheld controller and an assembly base. The handheld controller includes a user input component, a sensor configured to track at least one of motion and orientation of the handheld controller, and a first magnet of the handheld controller, located at an attachment region of the handheld controller. The assembly base is attachable to and detachable from the handheld controller, and comprises a first attachment region of the assembly base, forming a receiving portion at a surface of the assembly base. The assembly base further comprises a first magnet of the assembly base, disposed at the receiving portion. The receiving portion is shaped to receive the attachment region of the handheld controller. The handheld controller is attachable to the assembly base via the first magnet in the handheld controller and the first magnet in the assembly base. The handheld controller is pivotable about the receiving portion such that the assembly is operable as a joystick when the handheld controller is attached to the assembly base.

In an embodiment, the handheld controller is a first handheld controller, and the assembly further comprises a second handheld controller. The assembly base further comprises a second magnet disposed at a second attachment region, and comprises a third magnet disposed at a third attachment region. The first handheld controller is attachable to the second attachment region of the assembly base via the second magnet of the assembly base, and is also detachable from the second attachment region. The second handheld controller is attachable to the third attachment region of the assembly base via the third magnet of the assembly base, and is detachable from the third attachment region.

In an embodiment, the second attachment region and the third attachment region of the assembly base are on opposite sides of the assembly base.

In an embodiment, the first handheld controller comprises a second magnet located at a side thereof, and is attachable to the second attachment region of the assembly base via the second magnet of the first handheld controller.

In an embodiment, the second handheld controller comprises a first magnet located at attachment region thereof and comprises a second magnet located at a side thereof, wherein the second handheld controller is attachable to the first attachment region of the assembly base via the first magnet of the second handheld controller and the first magnet of the assembly base, and is attachable to the third attachment region of the assembly base via the second magnet of the second handheld controller and the third magnet of the third attachment region.

In an embodiment, a base of the first handheld controller curves in a first direction away from the assembly base, and a base of the second handheld controller curves in a second direction away from the assembly base, the first direction being opposite the second direction.

In an embodiment, at least one of the first handheld controller, the second handheld controller, and the assembly base is configured to generate a haptic effect utilizing at least one of its magnets.

In an embodiment, the assembly base includes a strap adapted for attachment to a body of a user.

In an embodiment, the assembly base is a first assembly base, and the peripheral device assembly further comprises a second assembly base that comprises a first magnet and a second magnet located at opposite sides of the second assembly base. The second assembly base is attachable to the first assembly base via the first magnet of the second assembly base. The second assembly base is attachable to the second handheld controller via the second magnet of the second assembly base.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 14A and 14B are frontal views of handheld controllers for forming a modular peripheral device assembly, according to an embodiment herein.

FIG. 15 is a frontal view of an assembly base for forming a modular peripheral device assembly, according to an embodiment herein.

FIGS. 19A and 9B are frontal views of an assembly base with a wearable strap, according to embodiments herein.

DETAILED DESCRIPTION OF THE INVENTION

Figure 1:
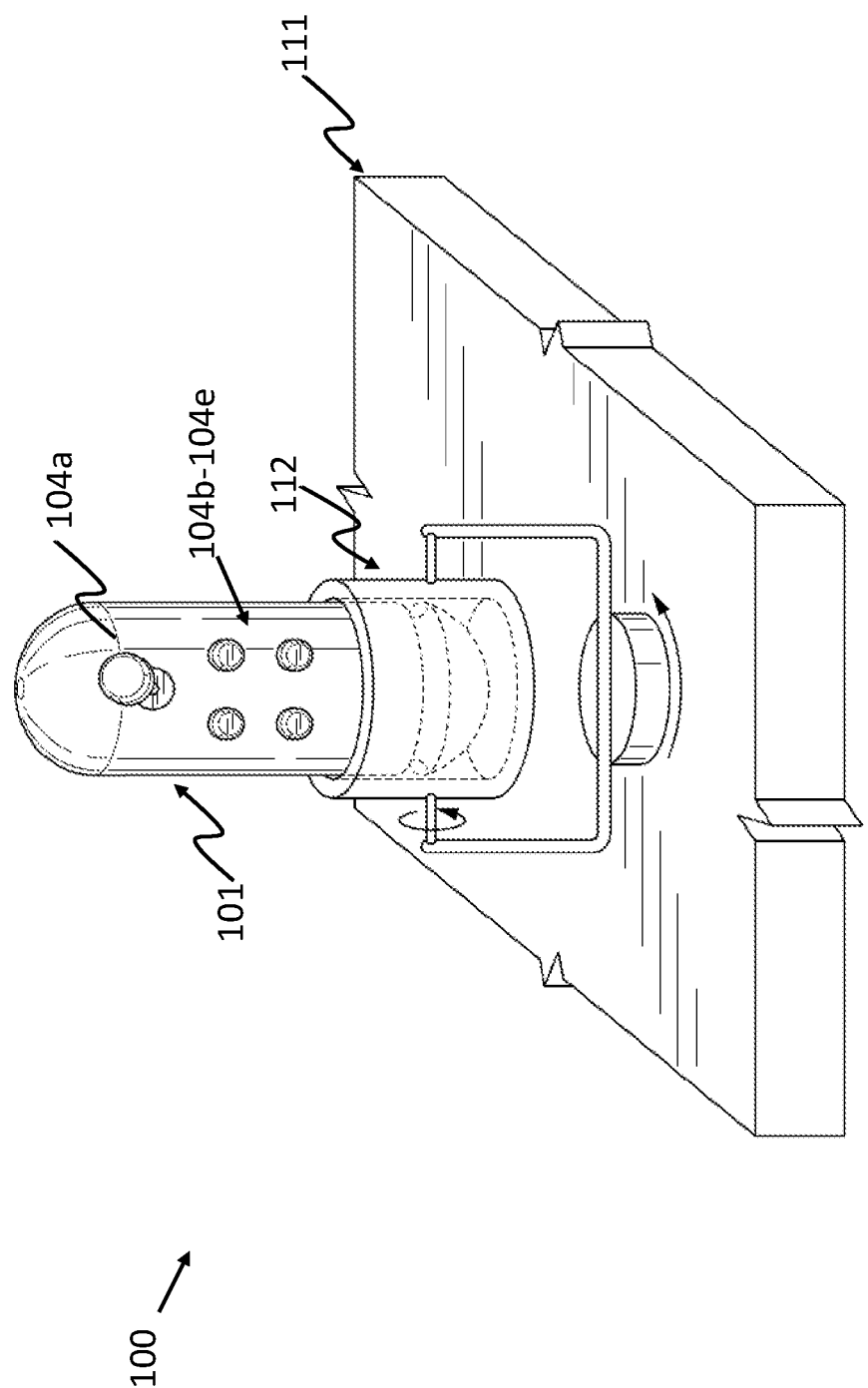
FIG. 1 is a perspective view of a modular peripheral device assembly, according to an embodiment herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a haptically-enabled modular peripheral device assembly that can be used in a gaming application, wearable application, augmented reality (AR) or virtual reality (VR) application, another computing application, or any other application. In an embodiment, the modular peripheral device assembly may include a handheld controller and an assembly base. The peripheral device assembly may be modular in that the handheld controller can be attached to the assembly base and used, e.g., as a joystick, or can be detached from the assembly base and used independently. The modular nature of the peripheral device assembly allows its use to be adapted to different applications, or different virtual environments in an application, or different physical environments (e.g., game playing in a living room versus game playing at a desk). For example, the handheld controller may be attached to the assembly base and used as a joystick for a combat simulation in a gaming application, while in other situations the handheld controller may be detached and used independently as a motion-sensing controller. In some cases, the attachment mechanism for the peripheral device assembly may include a sleeve and lock mechanism. In some cases, the attachment mechanism may include a plurality of magnets.

In an embodiment, the peripheral device assembly may include a plurality of haptic actuators. One or more of the haptic actuators may be located in the handheld controller, and one or more of the haptic actuators may be located in the assembly base. In some instances, the haptic actuators may have different capabilities, such as the ability to create different types of haptic effects, and/or different levels of haptic effect intensity. The plurality of haptic actuators may allow the peripheral device assembly to generate different haptic effects for different applications, or different situations in an application. In an embodiment, haptic effects may change based on whether the handheld controller is attached to or detached from the assembly base. For example, when the handheld controller is detached from the assembly base, a first type of haptic effect (e.g., a rumble or other vibrotactile haptic effect) or first level of haptic effect intensity may be generated, while when the handheld controller is attached to the assembly base, a second type of haptic effect (e.g., kinesthetic haptic effect) or second level of haptic effect intensity may be generated. In some instances, the selection of the haptic actuators being used to generate the haptic effect may be based on whether the handheld controller is attached to or detached from the assembly base. The generating of a haptic effect in the embodiments hereof may refer to creating a new haptic effect, or modulating one or parameters of an existing haptic effect for haptic playback.

FIG. 1 illustrates an example peripheral device assembly 100, which includes a handheld controller 101 and an assembly base 111. The handheld controller 101 and the assembly base 111 may be attachable to each other, as shown in FIG. 1, and may be detachable from each other. When the handheld controller 101 is detached from the assembly base 111, it may be used as a motion-sensing controller that tracks 6 DOF position of the controller. For instance, it may have motion-sensing capability similar to those in the Wii® Remote, Razer® Hydra, or the motion-sensing controllers for the Oculus Touch® and HTC Vive® systems. When the handheld controller 101 and the assembly base 111 are attached, the peripheral device assembly 100 may be operable as a joystick, with the handheld controller 101 acting as the manipulandum of the joystick. In some instances, the assembly base 111 may include an attachment component 112 which provides multiple degrees of freedom for the handheld controller 101 when it is attached to the base 111. In some cases, the assembly base 111 may be placed on a floor or a table. In some cases, the assembly base may be strapped to a user's body for a wearable application. In some cases, the assembly base may be incorporated into a piece of furniture.

Figure 2:
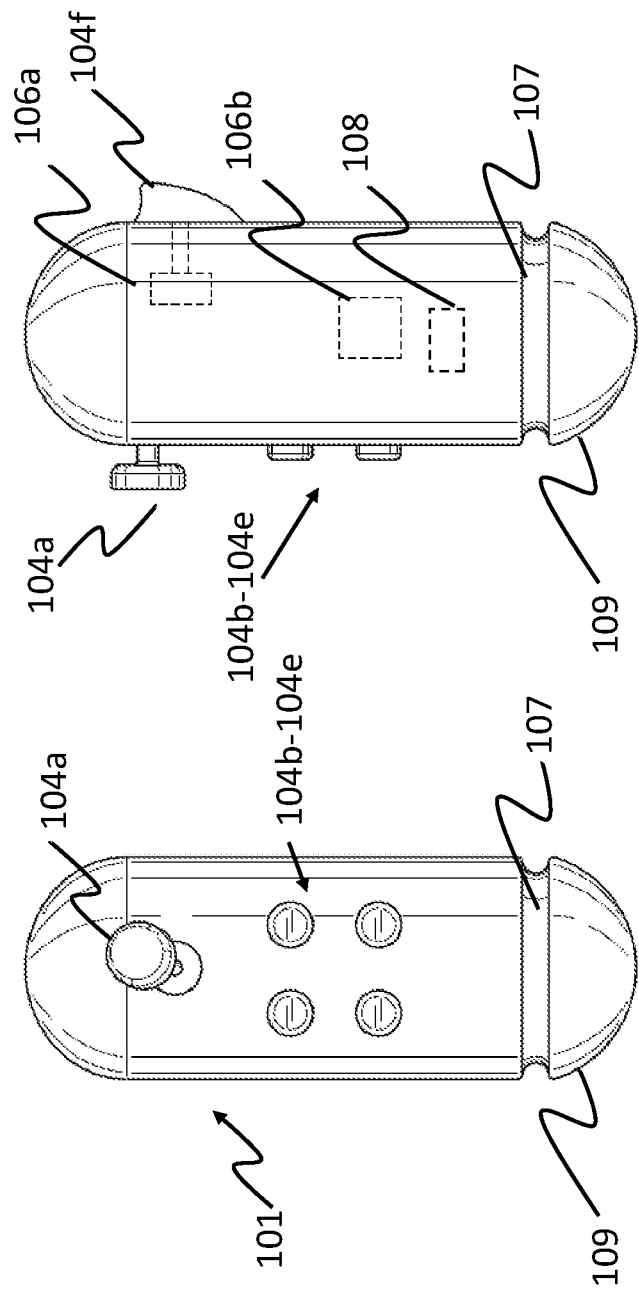
FIGS. 2A and 2B are front and side views of a handheld controller of a modular peripheral device assembly, according to an embodiment herein.

An example of the handheld controller 101 is shown in FIGS. 1, 2A, and 2B. The handheld controller 101 may include one or more user input components, a sensor configured to track at least one of motion and orientation of the handheld controller, and a first haptic actuator 106a/106b (as shown in FIG. 2B) configured to generate one or more haptic effects at the handheld controller. The one or more user input components may include a thumbstick 104a, push buttons 104b-104e, and (as shown in FIG. 2B) a trigger button 104f. The sensor 108 may include, for example, an accelerometer, a gyroscope, or any combination thereof. In some cases, the one or more user input components may generate a control signal, and the sensor may generate a measurement signal. These signals may be communicated over a wired or wireless channel to another device, such as a game console or other computer. In an embodiment, the handheld controller 101 may have a capacitive or other sensor that is configured to track hand or finger pose.

In an embodiment, the first haptic actuator (e.g., 106a) may be the only haptic actuator of the handheld controller 101. In another embodiment, as illustrated in FIG. 2B, the first haptic actuator 106a/106b may be a haptic actuator in a first set of haptic actuators of the handheld controller 101. The first set of haptic actors may include a targeted actuator 106a that is configured to create one or more kinesthetic haptic effects at the trigger button 104f, and a body actuator 106b. Haptic actuator 106a may include, for example, a motor and a transmission component configured to transfer a force or torque from the motor to the trigger button 104f, so as to generate a kinesthetic haptic effect at the trigger button 104f. Haptic actuator 106b may include, for example, an eccentric rotating mass (ERM) actuator or voice coil actuator configured to generate a rumble haptic effect or other vibrotactile haptic effect at the handheld controller 101. Generally speaking, examples of haptic actuators include a motor, an ERM actuator, a linear resonating actuator (LRA), a solenoid resonating actuator (SRA), or an actuator using a smart material such as a piezoelectric material, an electro-active polymer, or a shape memory alloy. Examples of a haptic effect generated in the peripheral device assembly include a vibrotactile haptic effect, a deformation-based haptic effect, an electrostatic friction (ESF) haptic effect, kinesthetic haptic effect, or any other type of haptic effect. In an embodiment, a peripheral device assembly that has actuators or other components to generate a deformation-based haptic effect may be configured to change a deformation configuration based on whether a handheld controller of the assembly is attached to an assembly base.

FIGS. 2A and 2B further show the handheld controller 101 to have a groove 107 at an end 109 (e.g., top end or bottom end) thereof. In some contexts, the groove 107 may be referred to as an attachment groove or a locking groove. As discussed in more detail below, the groove 107 may be used to attach the controller 101 to the assembly base 111. Additional components of the handheld controller 101 are described below with respect to FIG. 5.

Figure 3:
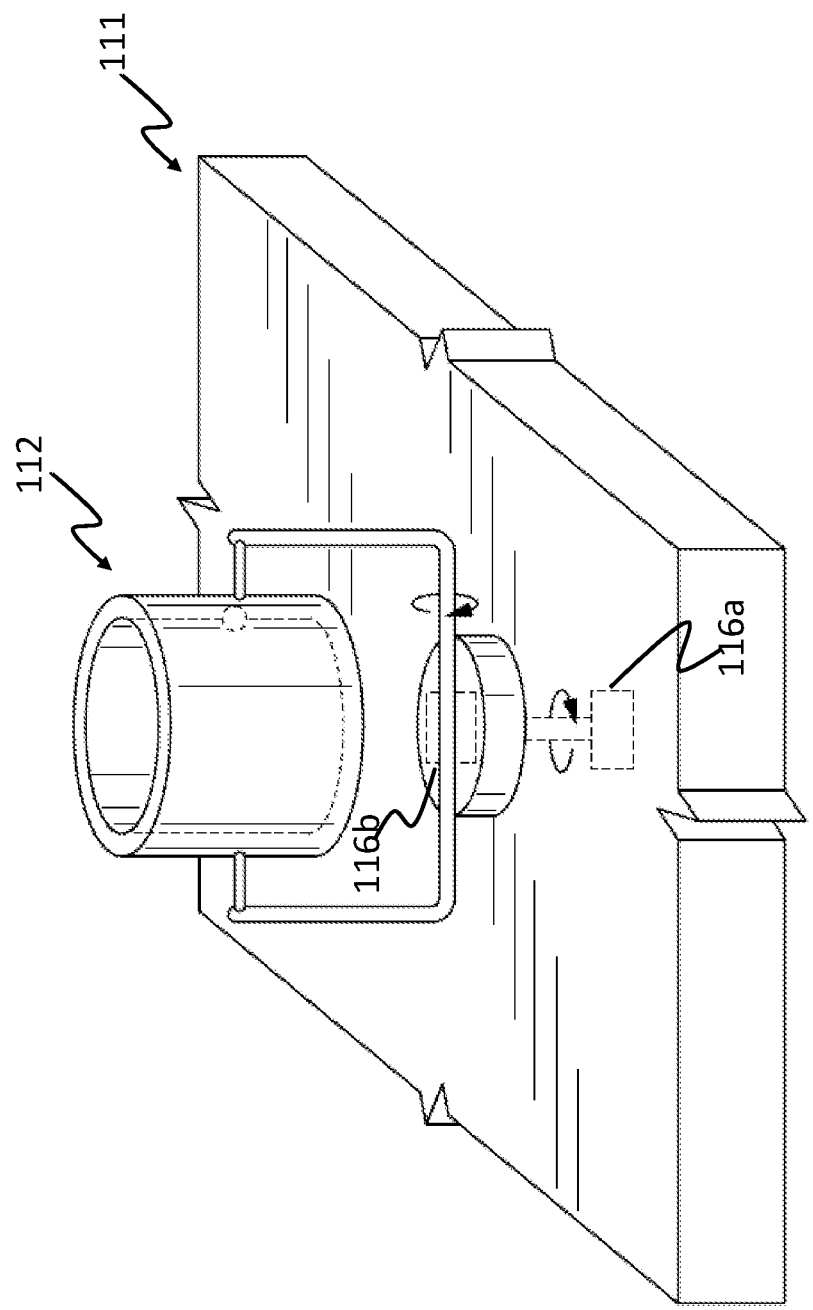
FIG. 3 is a perspective view of an assembly base of a modular peripheral device assembly, according to an embodiment herein.
Figure 4:
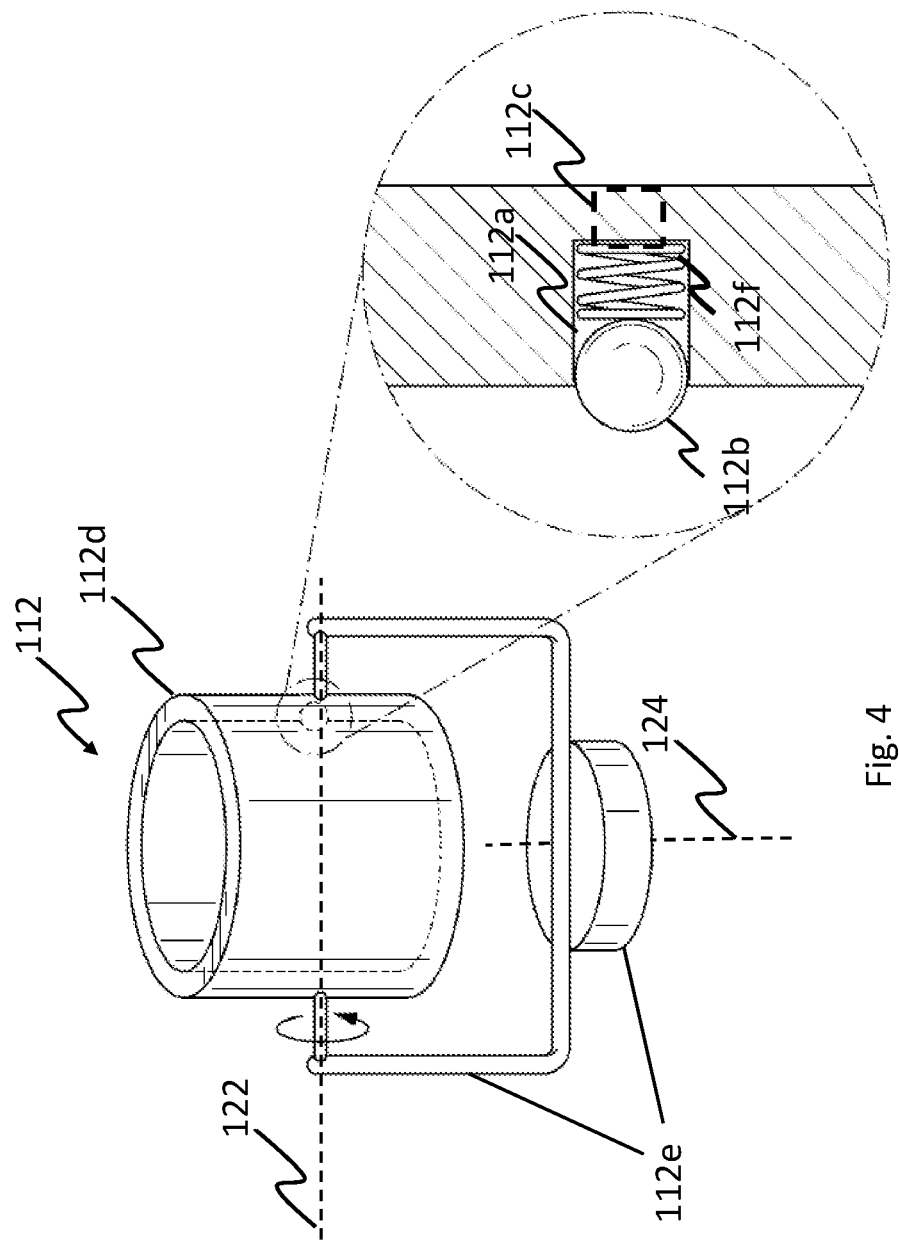
FIG. 4 is a side view and partial sectional view of an attachment component of an assembly base, according to an embodiment herein.

Turning to FIGS. 3 and 4, example features of the assembly base 111 are provided. The assembly base 111 may have the shape of a box, a plate, or any other shape. It may be configured to be attachable to another structure, such as a floor, a piece of furniture (e.g., attached to a table or to the arm rest of a chair), or a user body (e.g., via a strap attached to the assembly base), or may have no such attachment configurations. In an embodiment, the assembly base 111 includes an attachment component 112 and a second haptic actuator 116a/116b. In an embodiment, the second haptic actuator (e.g., 116a) is the only haptic actuator of the assembly base 111. In another embodiment, as illustrated in FIG. 3, the second haptic actuator 116a/116b is a haptic actuator in a second set of haptic actuators of the assembly base. The second set includes actuators 116a and 116b. In one example, the haptic actuators 116a and 116b are both motors that are configured to exert a force on the attachment component 112, so as to provide a kinesthetic haptic effect that can be perceived at the handheld controller 101 when it is attached to the base 111.

An embodiment of the attachment component 112 is shown in FIG. 4. In this embodiment, the attachment component 112 may be attachable with the handheld controller 101, and may itself have various degrees of freedom (e.g., 2 degrees of freedom) with respect to the rest of the assembly base 111. The attachment component 112 may thus provide a physical linkage that can transfer force or torque from the handheld controller 101 to any sensor in the assembly base 111 configured to sense motion along the various degrees of freedom (e.g., to sense joystick motion). This physical linkage may also transfer force or torque from one or more haptic actuators in the assembly base 111 to the handheld controller 101.

In FIG. 4, the attachment component 112 includes a cylindrical sleeve 112d that may be connected to a 2 degree of freedom (DOF) gimbal 112e, and may be able to be actuated to create a kinesthetic haptic effect for an object (e.g., handheld controller 101) connected to the attachment component 112. The gimbal 112e may comprise a pin and frame which permits rotation of the sleeve 112d about an axis 122 of the pin, and may further comprise a turnstile structure that allows the sleeve 112d to rotate about an orthogonal axis 124. In some cases, the sleeve may have a groove 112a in an inner surface thereof, such as a groove 112a that outlines a circular ring along the inner surface of the cylindrical sleeve. In an embodiment, the groove 112a may be part of a locking mechanism that also includes a ball 112b, or other object, that is extendable from the groove 112a. The ball 112b is extendable from the groove 112a of the attachment component, and is extendable to the groove 107 of the handheld controller 101 when the two grooves 112a, 107 are aligned. In this extended position, the ball 112b locks the handheld controller 101 to the assembly base 111. In embodiments in accordance herewith, the ball 112b may be biased, such as with a spring 112f, to one of a retracted position and an extended position. For instance, if the ball 112b is biased to an extended position, as shown in FIG. 4, the handheld controller 101 may be snapped into a locked position as its groove 107 slides into alignment with the groove 112a and the ball 112b automatically extends or snaps into the groove 107. In such instances, the ball 112b may be retracted using a manual release mechanism (e.g., a manual release button) or using another device, such as a solenoid 112c configured to pull the ball 112b to a retracted position. The ball 112b may be considered to be biased to an extended position relative to the groove 112a in FIG. 4 in the sense that the ball 112b is located at one end of the spring 112f, and the length of the spring 112f at equilibrium is long enough to cause the ball 112b to protrude outside of the groove 112a. If, in another embodiment, the ball 112b were biased to a retracted position, such as by a spring whose length at equilibrium is shorter than that shown in FIG. 4 such that the ball 112b is completely within the groove 112a, the ball 112b may be actuated to the extended position using the solenoid 112c or some other device. That is, the solenoid 112c is configured to push the ball 112b to the extended position. In an embodiment, the attachment component 112 may provide an electrical connection to communicate signaling and/or power, such as haptic control signaling and/or battery charging power, between the handheld controller 101 and the assembly base 111. In another embodiment, the attachment component may include a deformable material (e.g., electroactive polymer) at a surface thereof, so that the attachment component is capable of surface formation when the handheld controller 101 is pressed into the deformable material, or when the deformable material is actuated by another mechanism (e.g., with an electrical current that is passed through the deformable material). The surface deformation may create a receiving portion in the surface of the attachment component for receiving an end (e.g., 109) of the handheld controller 101. When the end of the handheld controller 101 is placed within the receiving portion, the attachment component may be configured to actuate the deformable material to wrap around the end of the handheld controller 101, so as to grasp onto the handheld controller 101. This actuation may attach the assembly base to the handheld controller 101. The deformable material may further be able to reverse its deformation, so as to release the end of the handheld controller 101 and allow detachment of the handheld controller 101 from the assembly base.

Figure 5:
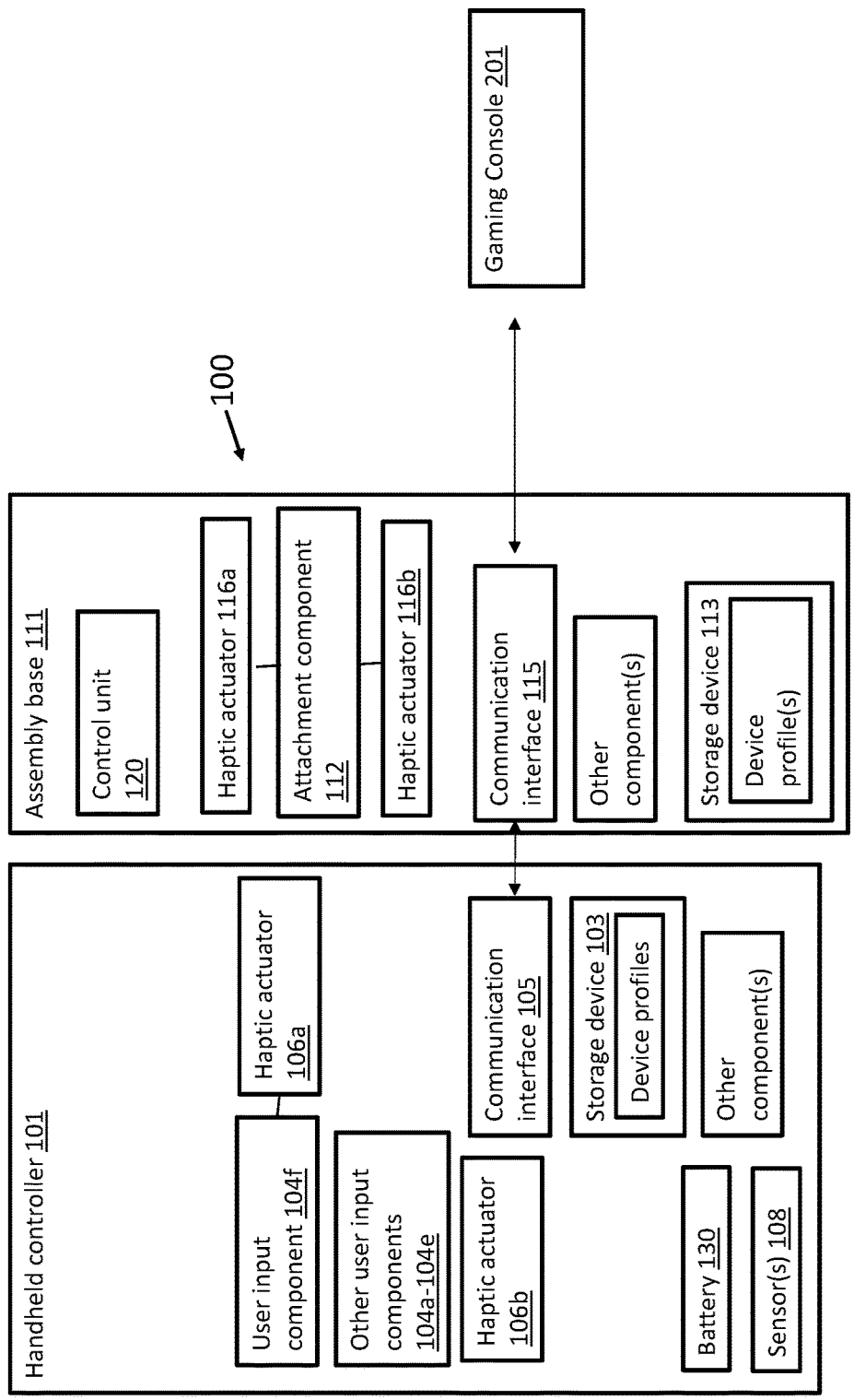
FIG. 5 is a functional block diagram view of a computing system that includes a peripheral device assembly, according to an embodiment herein.

A functional diagram of the handheld controller 101 and assembly base 111 is provided in FIG. 5. FIG. 5 shows the handheld controller 101 to include user input components (104a-104f), haptic actuators, and a sensor configured to sense motion and/or orientation of the controller 101 (as shown in FIGS. 1, 2A, and 2B), a communication interface 105, and a battery (or other power source) 130, and a storage device 103. The figure shows that haptic actuator 106a may be a targeted actuator that provides a targeted haptic effect for the trigger button 104f. The sensor 108 may be, e.g., a 6 DOF sensor used to track motion of the handheld controller 101 in six different degrees of freedom. The communication interface 105 may be a wireless (e.g., IEEE 802.11 or Bluetooth®) or wired communication interface configured to communicate a sensor measurement or control signal with a gaming console 201. The sensor signal may, for example, indicate to the gaming console 201 the motion or orientation of the handheld controller 101, while the control signal may indicate which user input components 104a-104f have been pressed or pulled. The communication interface 105 may communicate with the gaming console 201 via a communication interface 115 in the assembly base 111 (which may act as a base station that relays such communication), or may have the capability to directly communicate with the gaming console 201. In some cases, whether the communication interface 105 directly communicates with the gaming console may depend on whether the handheld controller 101 is attached to the assembly base 111.

In the example shown in FIG. 5, the storage device 103 (e.g., read-only firmware or reprogrammable Flash storage) may store one or more device profiles, such as one or more haptic actuator profiles. Each of the haptic actuator profiles may describe a haptic actuator in the controller 101, such as an actuator type (e.g., a piezoelectric versus an ERM actuator, or a rumble actuator versus a targeted actuator, such as a motor, for providing kinesthetic effects), location (e.g., attached to a trigger button versus centrally located), a level or range of output intensity, input type, or any combination thereof. The one or more device profiles in the storage device 103 and/or one or more device profiles in a storage device 113 of assembly base 111 may be used to intelligently determine what haptic effect is to be generated in the assembly 100, and by which haptic actuators. For example, if the device profiles indicate that a motor or other targeted actuator for generating a kinesthetic haptic effect is present in the assembly base 111, a kinesthetic haptic effect using the targeted actuator may be generated for a particular set of events. If the device profiles indicate that no targeted actuator for a kinesthetic haptic effect is present in either of the controller 101 or assembly base 111 of the assembly 100, a vibrotactile haptic effect using an ERM actuator may instead be generated for the same set of events.

FIG. 5 further shows the assembly base 111 to include the haptic actuators 116a, 116b, the attachment component 112 (as shown in FIGS. 3 and 4), the communication interface 115, the storage device 113, and a control unit 120. The haptic actuators 116a and 116b may provide a kinesthetic haptic effect through the attachment component 112. The communication interface 115 of the assembly base 111 may be a wireless and/or a wired communication interface that is configured to communicate with the communication interface 105 of the handheld controller 101. The storage device 113 may store one or more device profiles, such as one or more haptic actuator profiles as described above. The one or more device profiles in storage device 113 may be similar in format, content, and/or usage to those in storage device 103.

The control unit 120 in FIG. 5 may be configured to control a haptic effect for the peripheral device assembly 100, such as what type of haptic effect to generate, the intensity level of the haptic effect, and/or which actuators are to be used to generate the haptic effect. In the embodiment illustrated in FIG. 5, the control unit 120 is located in the assembly base 111. Generally speaking, the control unit for controlling the haptic effect in the peripheral device assembly 100 may be located in the handheld controller 101, the assembly base 111, in another device (e.g., gaming console 201), or any combination thereof. For example, the control unit may be implemented through a processing circuit (e.g., microprocessor, FPGA, PGA) on the handheld controller 101 and a processing circuit on the assembly base 111, which may jointly control haptic effects in the peripheral device assembly 100.

In some cases, wireless communication for the peripheral device assembly 100 may use a base station that is the handheld controller 101, the assembly base 111, or another device, such as an intelligent game board with figures placed on top acting as peripheral components.

In an embodiment, the modular nature of the assembly 100 allows it to be adapted to respective applications (e.g., an AR or VR application), respective events or other types of situations in those applications, respective locations (e.g., living room, desk, etc.), and/or respective gaming genres. As an example, if a user is playing a space combat game such as Star Citizen®, certain situations in the gaming application involve the simulation of a dogfight. In those situations, the user may combine the use of a VR headset and a peripheral device assembly 100 in which the handheld controller 101 is attached to the assembly base 111, and may be seated at a desk. The peripheral device assembly 100 may then be used as a joystick, which may provide, e.g., throttle control and kinesthetic haptic effects. Certain parts of Star Citizen®, however, involve situations that do not require combat, and are more centered on interacting with a virtual world of the game and being social with other players in the game. For these situations, the handheld controller 101 may be detached from the assembly base 111, to change its use from being the manipulandum of a joystick to a haptic tangible. A user may, e.g., take the handheld controller 101 and walk around his or her living room, to have more space than the desk area, in interacting with the virtual environment of the game.

Figure 6:
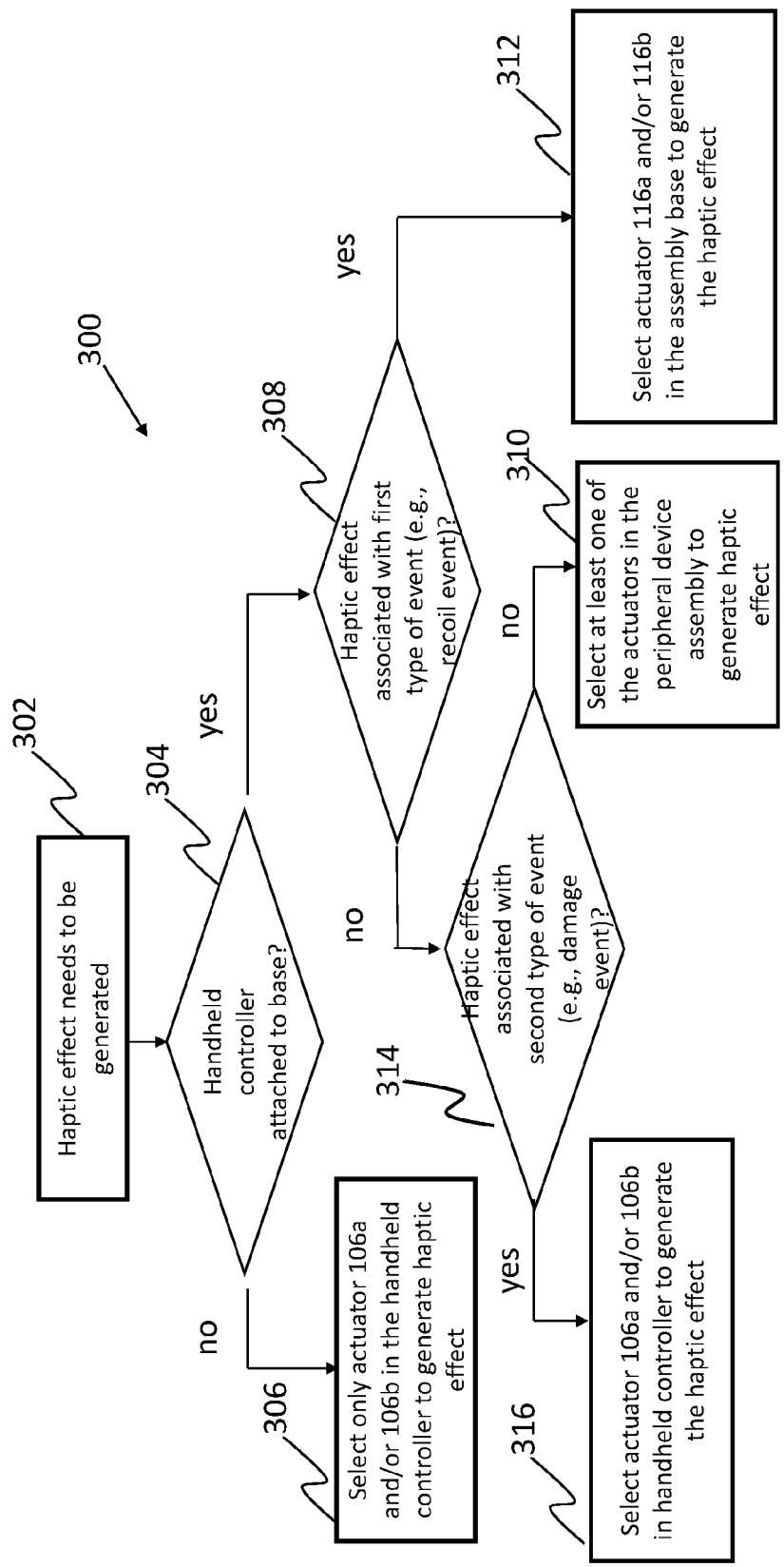
FIG. 6 provides a flow diagram of an example method of generating a haptic effect in a peripheral device assembly, according to an embodiment herein.

In an embodiment, the modular nature of the peripheral device assembly 100 allows a haptic effect in the peripheral device assembly 100 to be adapted, such as based on whether the handheld controller 101 is attached to the assembly base 111, or whether it is detached from the assembly base 111. As an example, FIG. 6 provides a flow diagram which illustrates a method 300 for generating a haptic effect for a peripheral device assembly, and includes selecting one or more haptic actuators to generate the haptic effect. The selection may be based on whether the handheld controller 101 is attached to the assembly base 111, and on an event in an application that triggers, or is otherwise associated, with the haptic effect. In an embodiment, the method 300 begins at step 302, in which a control unit (e.g., control unit 120) determines that a haptic effect needs to be generated. In some cases, this determination may be based on the occurrence of an event in an application (i.e., application event) receiving input from the peripheral device assembly 100. As an example, the application may be a first-person shooter game receiving input from user input components 104a-104f, and the event may include a damage event (e.g., a game player has taken damage) or a recoil event (e.g., there is recoil from a firearm being fired in the game).

In step 304, the control unit may determine whether the handheld controller 101 is attached to or detached from the assembly base 111 of the peripheral device assembly 100. For example, if the ball 112b is in a retracted state, it may be determined that the handheld controller 101 is not attached to the assembly base 111. In response to determining that the handheld controller 101 is detached from or otherwise not attached to the assembly base 111, the control unit may select from only actuators in the handheld controller 101 (e.g., select from only the first haptic actuator 106a/106b and any other haptic actuator of the handheld controller 101) to generate the haptic effect. For instance, control unit 120 in step 304 may select only actuator 106a and/or 106b in the handheld controller 101.

In some instances, in response to determining that the handheld controller 101 is attached to the assembly base 111, the control unit may be configured to perform the selection of at least one haptic actuator to generate the haptic effect based further on a type of application event (e.g., a recoil event or damage event in a game) that the haptic effect is associated with. For instance, the control unit may determine in step 308 whether the haptic effect is associated with a first type of event (e.g., a recoil event) in the application which is receiving input from the peripheral device assembly 100. In step 312, in response to determining that the handheld controller 101 is attached to the assembly base 111 and that the event is a first type of event in the application, the control unit may be configured to select an actuator from among the one or more actuators in the assembly base (e.g., select the second haptic actuator 116a/116b). As an example, the first type of event may be a recoil event. When the handheld controller 101 is not attached to the assembly base 111, the recoil event may trigger a rumble haptic effect generated by actuator 106b in the handheld controller 101 (step 306). When the handheld controller 101 is attached to the assembly base 111, the recoil event may trigger a kinesthetic haptic effect generated by actuators 116a, 116b in the assembly base 111 (step 312). In an embodiment, the control unit may select from only the second haptic actuator (e.g., 116a) and any other haptic actuator (e.g., 116b) of the assembly base to generate haptic effect. In an alternate embodiment, the control unit may additionally select actuator 106a or 106b for the haptic effect.

If the haptic effect is associated with a second type of event (e.g., a damage event), either instead of or in addition to the first type of event, the haptic effect may continue to be generated by actuators in the handheld controller. For example, if the haptic effect is not associated with a first type of event, the control unit in step 314 may determine whether the haptic effect to be generated is associated with a second type of event (e.g., the damage event). In response to determining that the handheld controller is attached to the assembly base and that the haptic effect is associated with the second type of event, the control unit in step 316 may select the first haptic actuator 106a/106b in the handheld controller. The control unit in step 316 may select only one or more actuators in the handheld controller (e.g., select only actuator 106a, only actuator 106b, or both), or may additionally select a haptic actuator in the assembly base. In an embodiment, if the haptic effect is not associated with the first type of event nor the second type of event, the control unit in step 310 may select any actuator in the peripheral device assembly 100 to generate a haptic effect.

In an embodiment, an event in an application may be associated with different haptic effects or different types of haptic effects, and the different haptic effects or types of haptic effects may be ranked in terms of priority, or based on some other criteria. The ranking may be stored in a device profile, or may be determined dynamically. For example, a game may include a recoil event arising from the firing of a weapon in the game. The recoil event may be associated with a trigger-based haptic effect, a high-definition (HD) vibrotactile haptic effect, and a rumble haptic effect. The three haptic effects may be ranked to, e.g., assign a top rank to the trigger-based haptic effect, a second rank to the rumble haptic effect, and a third rank to the HD vibrotactile haptic effect. When a recoil event occurs, a control unit of the assembly may select, from among the three haptic effects, the highest ranked haptic effect for which hardware is available. For example, the trigger-based haptic effect that is top-ranked may require a targeted actuator (e.g., 106a) attached to a device trigger. For some models of handheld controllers, this actuator may be unavailable. If the actuator were unavailable, the control unit may select the second-ranked haptic effect, e.g. a rumble haptic effect if there is an actuator (e.g., haptic actuator 106b) available in the handheld controller for generating the rumble effect. In some cases, the actuator for a particular haptic effect may be located in the assembly base. In those instances, the actuator may be considered available if the assembly base were attached to the handheld controller, and may be considered unavailable if the assembly base were not attached to the handheld controller. Thus, in general, the control unit may select the highest ranked haptic effect for which an actuator is available.

In some instances, a control unit may select both a haptic actuator in the handheld controller 101 and a haptic actuator in the assembly base 111 to generate a haptic effect. For instance, in response to a determination that the handheld controller is attached to the assembly base, the control unit may be configured to select actuators 116a, 116b in the assembly base 111 to generate the haptic effect, and to also select a first haptic actuator 106a/106b in the set of one or more haptic actuators of the controller 101 to generate the haptic effect. In some cases, the selection of respective haptic actuators in both the controller 101 and the assembly base 111 may be done only if the device profile information stored on the peripheral device assembly (e.g., in one of storage device 103 or 113) indicates that an output intensity of the actuator 106a or 106b to be selected from the handheld controller 101 is less than a programmed threshold. For instance, the control unit may select motors in the assembly base 111 to generate a haptic effect. It may also select a body actuator, such as actuator 106b, or a targeted actuator, such as actuator 106a, in the handheld controller 101 to augment the haptic effect, but only if the output of those actuators in the handheld controller 101 will not interfere with the output of the motors.

In some embodiments, the control unit may select respective actuators in both the handheld controller 101 and the assembly base 111, but may delay the activation of the actuators relative to each other. For example, in response to a determination that the handheld controller is attached to the assembly base, the control unit may be configured to select both an actuator in the handheld controller and to select an actuator in the assembly base to generate the haptic effect with a delay in activation of the selected actuator of the handheld controller relative to activation of the selected actuator of the assembly base.

Figure 7:
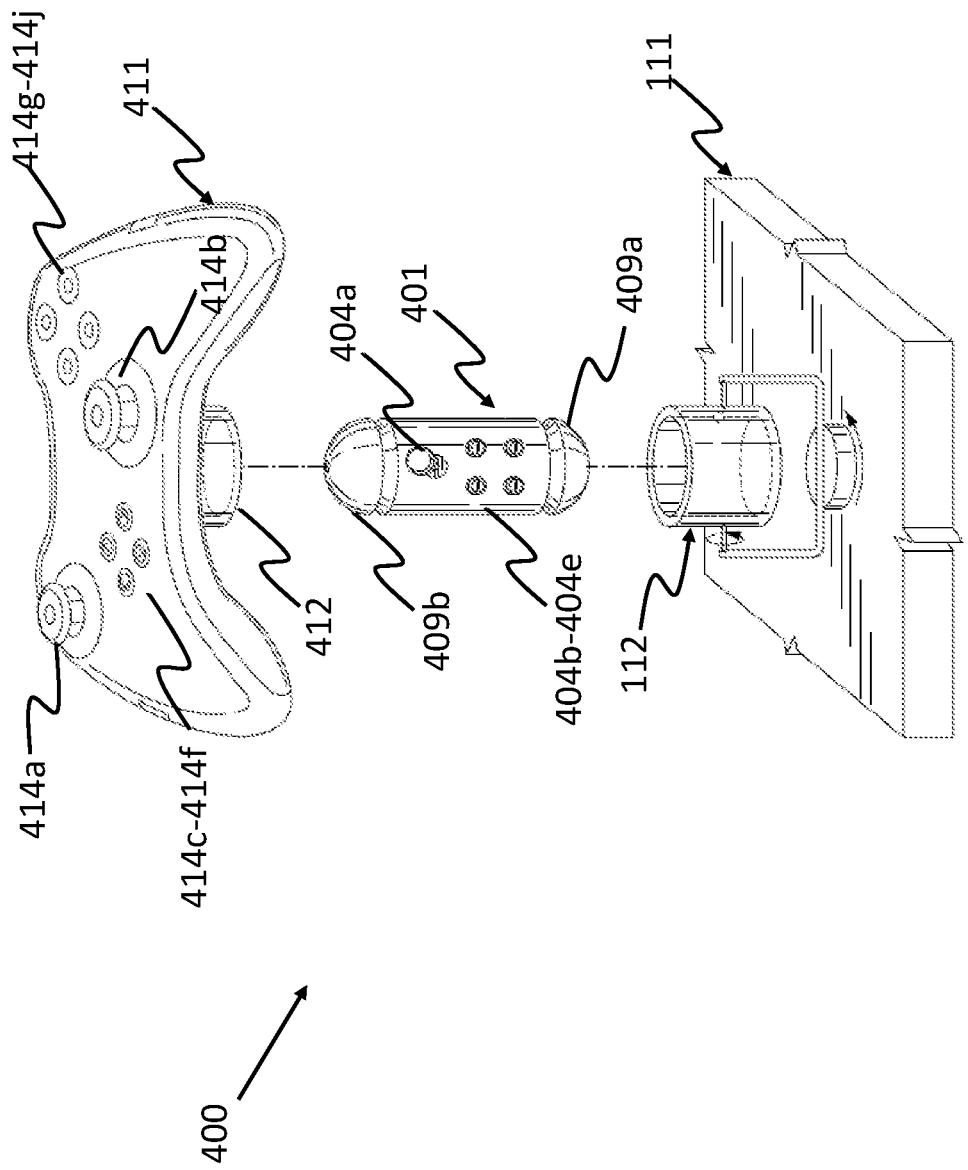
FIG. 7 is a perspective view of a modular peripheral device assembly, according to an embodiment herein.

FIG. 7 illustrates a peripheral device assembly 400 that includes both a first handheld controller 401 and a second handheld controller 411 (e.g., a gamepad), as well as an assembly base 111. In embodiments hereof, only the first handheld controller 401 and the assembly base 111 may be attachable to each other, such as by having an end 409a of the first handheld controller 401 being received within the attachment component 112 of the assembly base 111. In embodiments hereof, the first handheld controller 401 may be further attached to the second handheld controller 411, at an end 409b of the first handheld controller 401. In such embodiments, the second handheld controller 411 may comprise an attachment component 412 that is attachable to and detachable from the end 409b of the first handheld controller 401. In some cases, the second handheld controller 411 may be attached to provide an alternative joystick grip (e.g., a two-handed game controller grip), to provide a steering wheel, or to provide some other grip. In some cases, the second handheld controller 411 may be designed as a two-handed controller, while the first handheld controller 401 may be designed as a one-handed controller.

Figure 8:
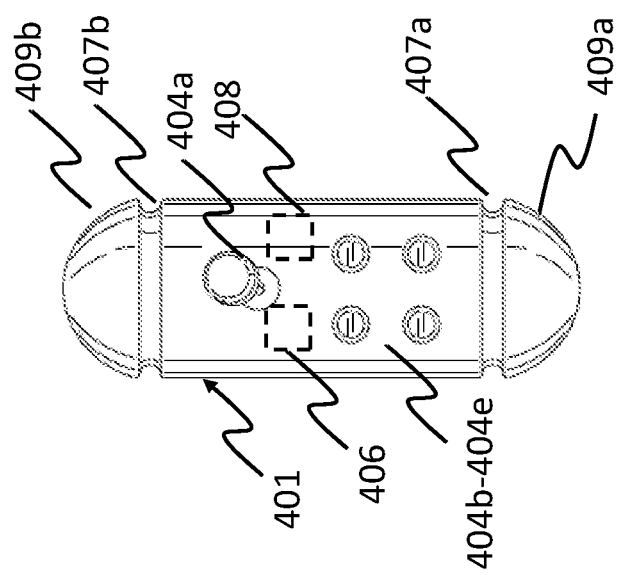
FIG. 8 is a front side view of a first handheld controller in a modular peripheral device assembly, according to an embodiment herein.

FIG. 8 provides a side view of an embodiment of the first handheld controller 401. In this embodiment, the first handheld controller 401 includes user input components (a thumbstick 404a, push buttons 404b-404e, and a trigger button (not shown)), a haptic actuator (e.g., actuator 406), and a sensor 408 configured to sense at least one of motion and orientation of the controller 401. The haptic actuator 406 may be the only haptic actuator of the first handheld controller 401, or may be a haptic actuator in a set of haptic actuators of the first handheld controller 401. In some instances, the haptic actuator 406 may be denoted as the first haptic actuator of the assembly 400, and a haptic actuator in the assembly base 111 may be denoted as the second haptic actuator of the assembly 400. In some cases, the first handheld controller 401 has a groove 407a at one end 409a of the first handheld controller 401 and another groove 407b at the other end 409b of the controller 401. The grooves 407a, 407b may be used to attach the first handheld controller 401 to the assembly base 111 and to the second handheld controller 411, respectively.

Figures 9A, 9B:
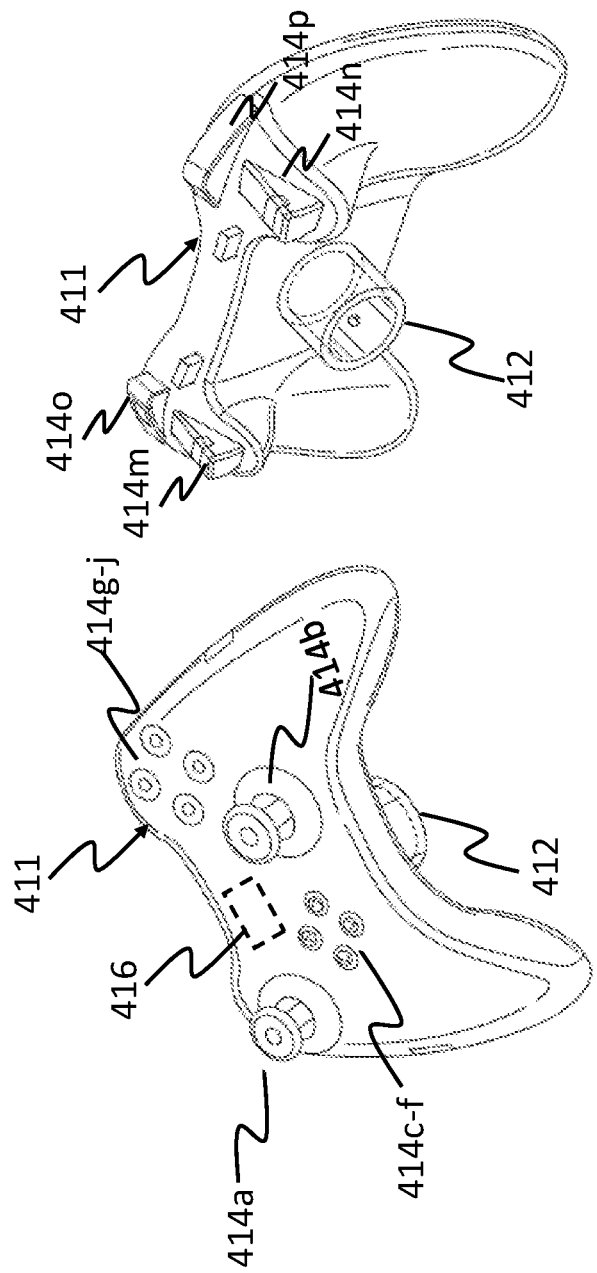
FIGS. 9A and 9B are perspective views of a second handheld controller in a modular peripheral device assembly, according to an embodiment herein.

FIGS. 9A and 9B provide perspective views of an embodiment of the second handheld controller 411. In an embodiment, the second handheld controller 411 includes multiple user input components (thumb sticks 414a, 414b, push buttons (e.g., directional buttons) 414c-414f, 414g-414j, toggle buttons 414o, 414p, and trigger buttons 414m, 414n), and a haptic actuator 416, and an attachment component 412. The attachment component 412 may be attachable to and detachable from an end 409b of the first handheld controller 401. The haptic actuator 416 may be the only haptic actuator of the second handheld controller 411, or may be an actuator in a set of haptic actuators of the second handheld controller 411. In some instances, the haptic actuator 416 may be denoted the third haptic actuator of the assembly 400.

In an embodiment, when the first handheld controller 401 is attached to the second handheld controller 411, one or more user input components in the first handheld controller 401 may be disabled in functionality. The functionality of the disabled user input components may be replaced by one or more user input components in the second handheld controller 411. For instance, when the first handheld controller 401 and the second handheld controller 411 are attached to each other, the thumbstick 404a in the first handheld controller 401 may be disabled. Thumbstick 414a or 414b in the second handheld controller 411 may be activated and replace the use of thumbstick 404a.

In an embodiment, a control unit (e.g., control unit 120) that controls one or more haptic effects in the assembly 400 may be located in at least one of the first handheld controller 401, the second handheld controller 411, and the assembly base 111. The control unit may be configured to vary the haptic effect for the peripheral device assembly 400 based on whether the second handheld controller 411 is attached to or detached from the first handheld controller 401.

In an embodiment, when the first handheld controller 401 is attached to the assembly base 111 and is not attached to the second handheld controller 411, the control unit may be configured to select an actuator in the first handheld controller 401, and no actuator in the second handheld controller 411, to generate a haptic effect. In an embodiment, when the first handheld controller 401 is attached to both the assembly base 111 and the second handheld controller 411, the control unit may be configured to select an actuator 416 in the second handheld controller 411 to generate a haptic effect. In an embodiment, when the second handheld controller 411 is attached to the first handheld controller 401, the haptic actuator 416 in the second handheld controller 411 may supplement or replace the haptic actuator 406 in the first handheld controller 401 for generating one or more haptic effects.

In an embodiment, the second handheld controller 411 may be configured as a two-handed controller, and the first handheld controller 401 may be configured as a one-handed controller. In such cases, the second handheld controller 411 may be better suited to receiving a stronger haptic effect. Thus, the control unit may increase a level of haptic effect intensity when the second handheld controller 411 is attached in the assembly 400. For example, when the first handheld controller 401 is attached to the assembly base 111 and is not attached to the second handheld controller 411, such that a user would be holding the first handheld controller 401 with one hand, the control unit may be configured to select an actuator 406 with a first level of output intensity to generate a haptic effect. When the first handheld controller 401 is attached to the both second handheld controller 411 and the assembly base 111, such that a user would be holding the second handheld controller 411 with both hands, the control unit may be configured to select the actuator 406 and/or actuator 416, with a second level of intensity that is higher than the first level of output intensity, to generate a stronger haptic effect.

FIGS. 9A and 9B further show the attachment component 412 of the second handheld controller 411. The attachment component 412 may, for instance, attach to the end 409b of the first handheld controller 401. In an embodiment, the attachment component 412 may be similar in structure to the attachment component 112 in FIG. 4. For example, the attachment component 412 may include a sleeve having a groove and a ball extendable from the groove. The ball may be configured to extend from the groove in the attachment component 412 to another groove 407b in the first handheld controller 401 when the two grooves are aligned. When the ball is extended to the groove 407b, the two handheld controllers 401, 411 may be locked in an attached configuration.

Figure 10:
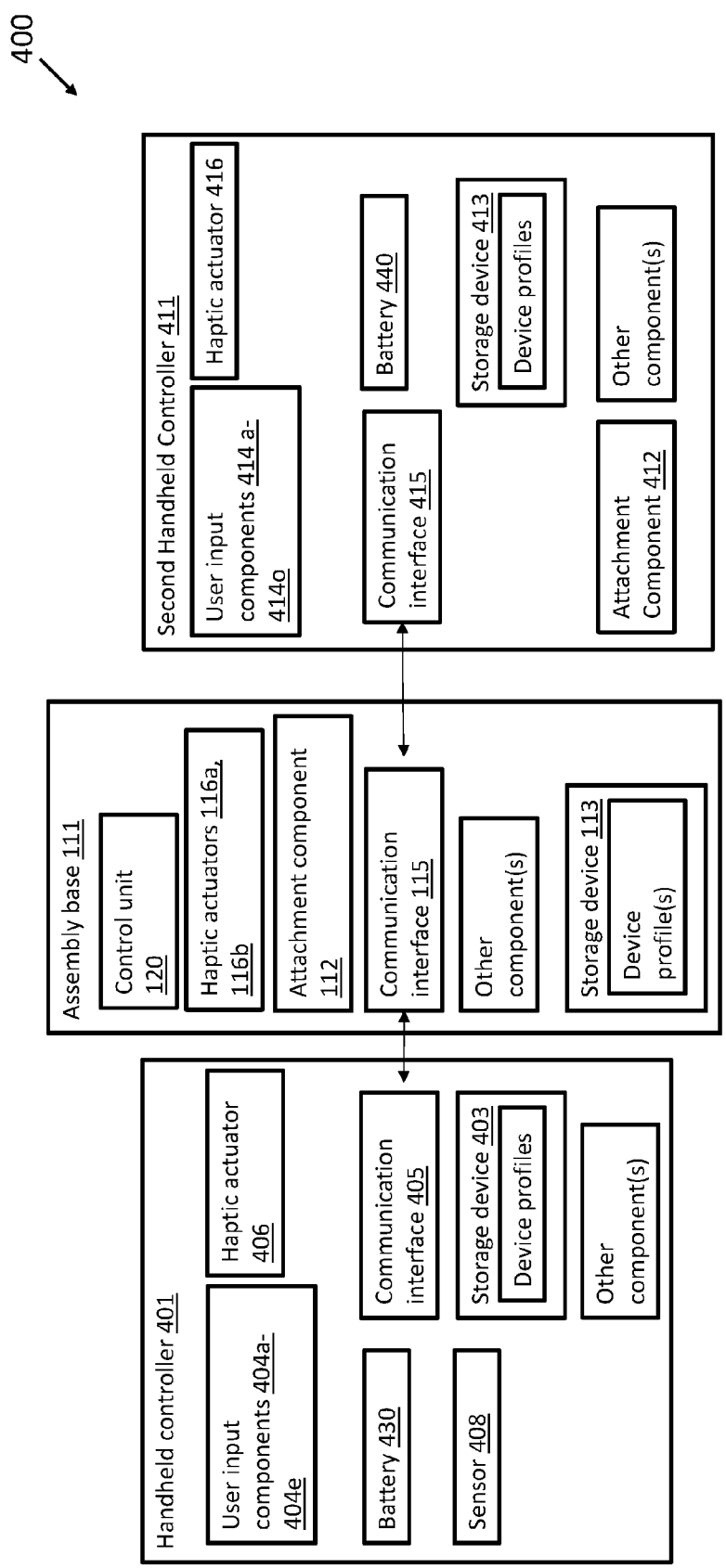
FIG. 10 is a functional diagram of an example peripheral device assembly that includes at least two handheld controllers, according to an embodiment herein.

FIG. 10 is a functional diagram of the peripheral device assembly 400. The functional diagram depicts communication between the first handheld controller 401 and the assembly base 111, and communication between the second handheld controller 411 and the assembly base 111. The assembly base may relay the communication to, e.g., a gaming console or any other computer. In some instances, however, one or both of the handheld controllers 401 and 411 may be configured to directly communicate with a gaming console. FIG. 10 depicts the first handheld controller 401 to include user input components 404a-404e, haptic actuator 406, sensor 408 (as shown in FIG. 8), a storage device 403, a communication interface 405, and a battery 430. FIG. 10 further depicts the second handheld controller 411 to include user input components 414a-414o, attachment component 412, haptic actuator 416 (as shown in FIGS. 9A and 9B), a communication interface 415, a storage device 413, and a battery 440. The functional diagram for the assembly base 111 is similar to that in FIG. 5, and includes a control unit 120, haptic actuators 116a, 116b, an attachment component 112, a communication interface 115, and a storage device 113. In an embodiment, the second handheld controller 411 does not include any sensor for sensing motion or orientation of the second handheld controller 411.

Figure 11:
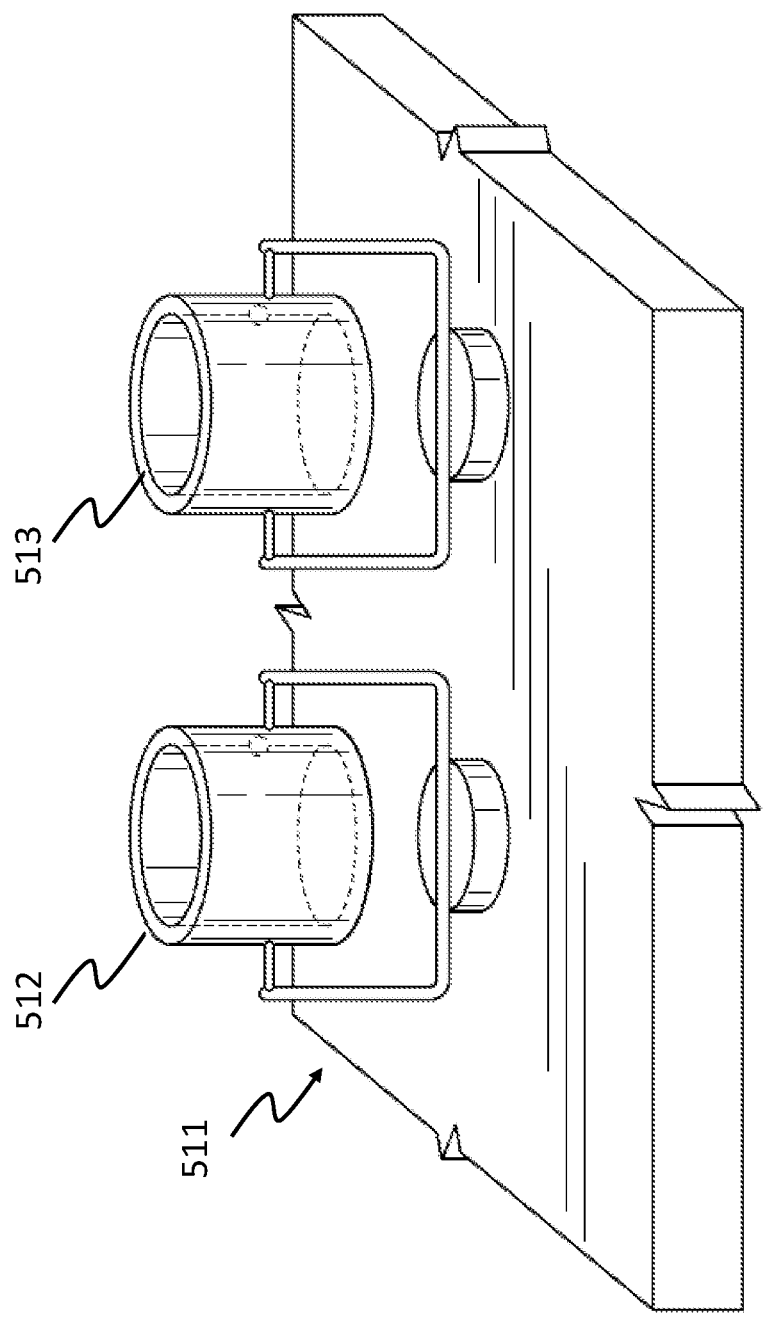
FIG. 11 is a perspective view of an assembly base having at least two attachment components, according to an embodiment herein.

FIG. 11 provides an embodiment in which the assembly base 511 may include at least two attachment components 512, 513 that are attachable to and detachable from two respective handheld controllers (e.g., handheld controllers 101, 401). Each of the attachment components 512, 513 may have a structure similar to the attachment component 112 in FIG. 4. For example, each of the attachment components 512, 513 may have a groove with a ball extendable from the groove. When the ball in one of the attachment components is in an extended position, the attachment component may be locked to a respective handheld controller.

Figure 12:
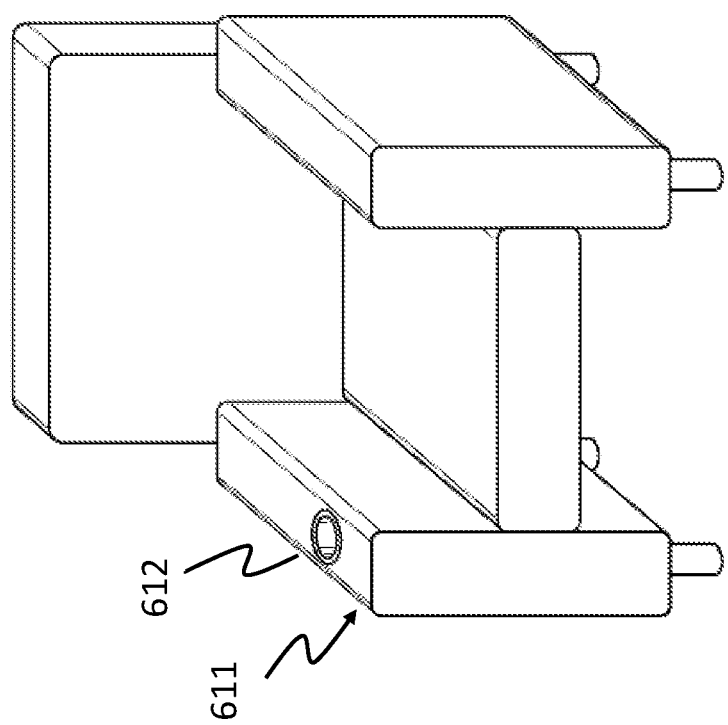
FIG. 12 is a perspective view of an assembly base incorporated into a piece of furniture, according to an embodiment herein.

FIG. 12 provides another embodiment of an assembly base 611 that is incorporated into a piece of furniture. In this embodiment, assembly base 611 may have a body that is part of a piece of furniture, such as a chair or sofa. The assembly base 611 may have an attachment component 612 that is integrated into the furniture (e.g., into an arm rest of the chair). This embodiment may provide an assembly base 611 that is more likely to remain stationary, which may provide enhanced stability for gameplay.

Figure 13:
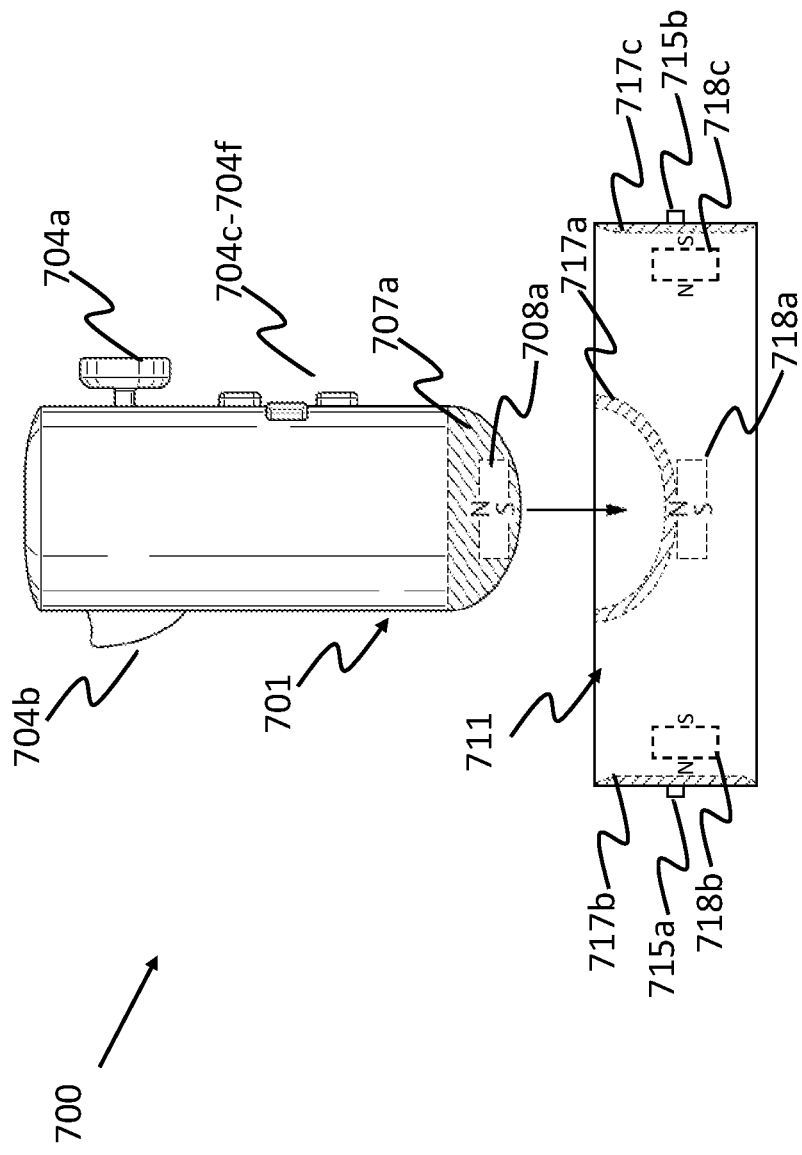
FIG. 13 is a side view of a modular peripheral device assembly that uses one or more magnets for attachment of components, according to an embodiment herein.
Figure 16:
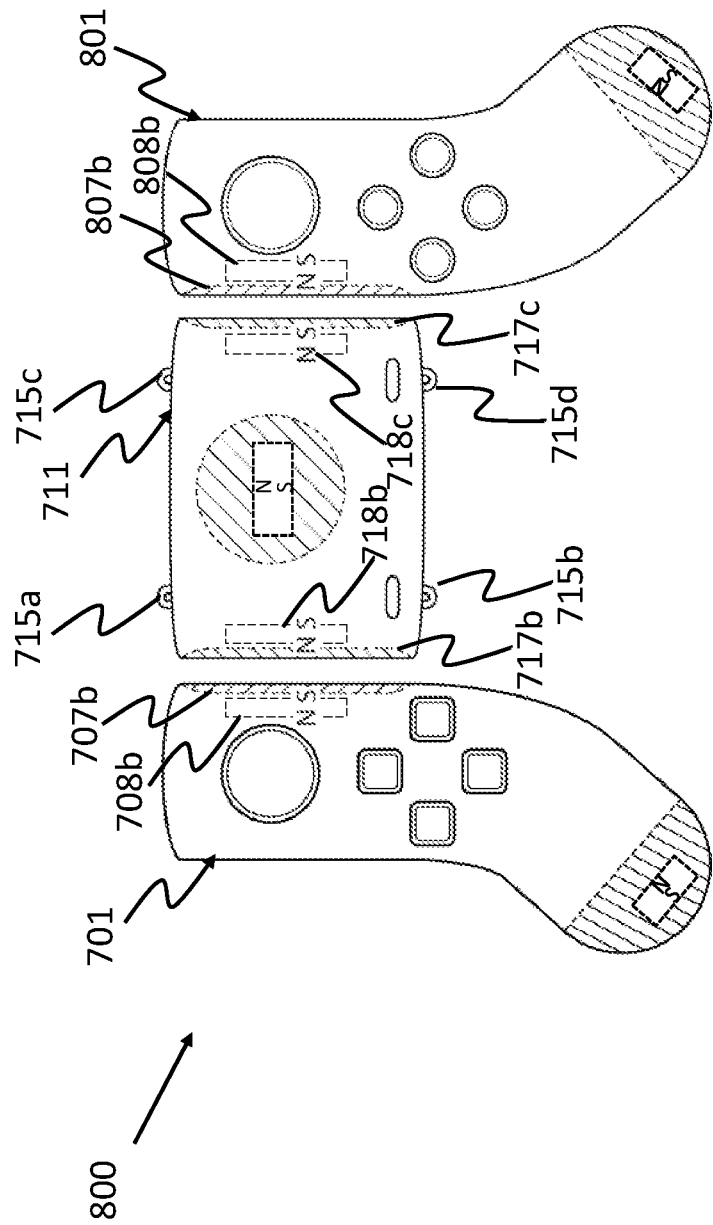
FIGS. 16-18 are frontal views of respective peripheral device assemblies, according to embodiments herein.
Figure 17:
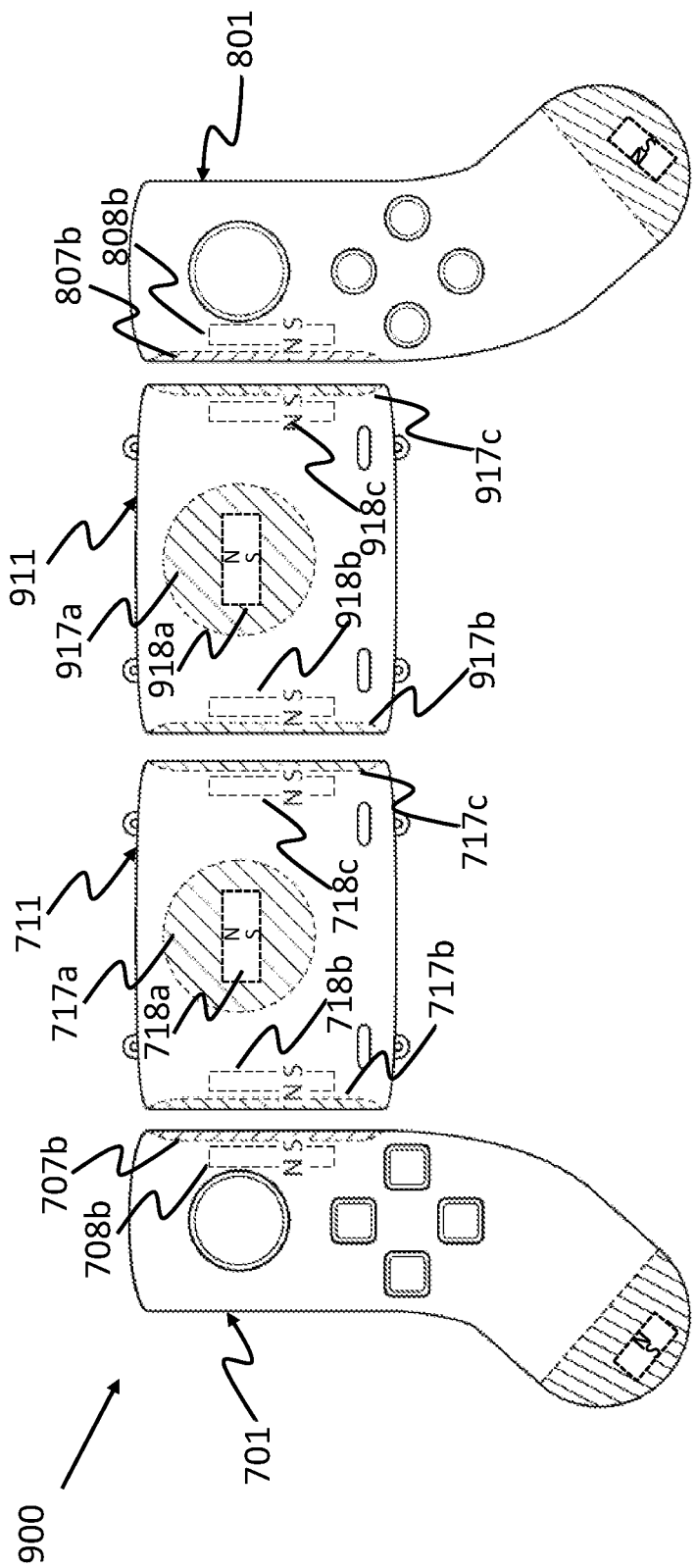

FIGS. 13-18 show modular peripheral device assemblies in which a handheld controller is magnetically attachable (e.g., via permanent magnets and/or electromagnets) to an assembly base (or to another handheld controller). FIG. 13 illustrates a peripheral device assembly 700 in which a handheld controller 701 is magnetically attachable to and detachable from an assembly base 711 via an attachment region 707a at a base or bottom of the controller 701 and a corresponding attachment region 717a (e.g., a receiving portion) in the assembly base 711. FIGS. 16 and 17 illustrate modular peripheral device assemblies 800, 900 in which a first handheld controller 701 and a second handheld controller 801 are attached at respective attachment regions 707b, 807b to the same assembly base 711 (FIG. 16) and to respective assembly bases 711, 911 (FIG. 17).

With reference once again to FIG. 13, the peripheral device assembly 700 is configured to permit the handheld controller 701 to be magnetically attached to the assembly base 711 at a base of the controller 701. In this configuration, the handheld controller 701 may be pivotable within the attachment region 717a of the assembly base 711, such that the peripheral device assembly 700 is operable as a joystick when the handheld controller 701 is attached to the assembly base 711.

In an embodiment, the handheld controller 701 includes one or more user input components, one or more attachment regions, and one or more magnets. In some embodiments, the handheld controller 701 further includes one or more sensors and one or more haptic actuators. As shown in FIGS. 13 and 14A, the plurality of user input components may include a thumbstick 704a, a trigger button 704b, and/or push buttons 704c-704f. As further shown in FIGS. 13 and 14A, the attachment regions in the handheld controller 701 may include attachment region 707a at a base of the controller 701 and an attachment region 707b at a side of the controller 701. A magnet 708a may be disposed at (e.g., within the boundary of, or adjacent to) the attachment region 707a, and a magnet 708b may be disposed at the attachment region 707b. Each of the magnets 708a, 708b may be used for attachment with the assembly base 711. In an embodiment, a sensor in the handheld controller 701 may be configured to track at least one of motion and orientation of the handheld controller 701. In an embodiment, any haptic actuator in the handheld controller 701 may include one or more of the magnets 708a, 708b. In an embodiment, any haptic actuator in the controller 701 is separate from the one or more magnets 708a, 708b. The first handheld controller 701, the second handheld controller 801, and the assembly base 711 may further include any of the components shown in the functional diagrams of FIGS. 5 and 10.

In an embodiment, the assembly base 711, as shown in FIGS. 13 and 15, may include a plurality of attachment regions 717a, 717b, 717c, and a plurality of respective magnets 718a, 718b, 718c disposed at the respective attachment regions. The attachment region 717a and the magnet 718a may form an attachment component to attach the assembly base 711 to a base of the handheld controller 711. Further, the attachment region 717a may form a receiving portion 717a disposed at a surface of the assembly base 711, and may be shaped to receive the attachment region 707a of the handheld controller 701. For example, the attachment region 707a may curve outward and have a semi-circular end, elliptical end, or other curved-end such that the attachment region 707a has a circular, or elliptical cross section, while the receiving portion 717a may form a recess having a complementary shape that fits around the semi-circular end, elliptical end, or other curved-end of the attachment region 707a so as to receive the attachment region 707a. Moreover, the attachment region 707a of the handheld controller 701 may be attachable to the attachment region 717a of the assembly base 711 via the magnet 708a and the magnet 718a. In this attached configuration, the handheld controller 701 is pivotable about the receiving portion 717a such that the peripheral device assembly 700 is operable as a joystick when the handheld controller 701 is attached to the assembly base 711.

FIGS. 13, 15 and 16 further show an embodiment in which the assembly base 711 includes hooks 715a-715d that are usable in a wearables context. As described in later figures (FIGS. 19A and 19B), the hooks 715a-715d may be attached to straps, which may in turn be attached to a user's body.

FIG. 16 illustrates a modular peripheral device assembly 800 in which two handheld controllers (701 and 801) are attached to the assembly base 711. The peripheral device assembly 800 may be used, for example, as a two-handed game controller. The handheld controller 701 and assembly base 711 are described above with respect to FIGS. 13, 14A, and 15. The handheld controller 801 is shown in FIG. 14B. In an embodiment, the handheld controller 801 includes one or more user input components (e.g., a thumbstick 804a, a trigger button, and push buttons 804c-804f), one or more attachment regions 807a, 807b, one or more magnets 808a, 808b disposed at the respective attachment regions 807a, 807b, one or more motion or orientation sensors, and one or more haptic actuators. In an embodiment, the handheld controller 701 may be a left-handed controller, and the handheld controller 801 may be a right-handed controller. For example, the base of the handheld controller 701, at the attachment region 708a, may curve in a first direction away from the assembly base 711. Meanwhile, a base of the handheld controller 801, at the attachment region 808a, may curve in a second and opposite direction away from the assembly base 711.

As shown in FIG. 16, the handheld controller 701, the handheld controller 801, and the assembly base 711 may be magnetically attached as a peripheral device assembly 800. In the peripheral device assembly 800, the attachment region 707b at a side of controller 701 may be attached to a corresponding attachment region 717b at a side of the assembly base 711. The attachment may be achieved via magnets 708b and 718b in the controller 701 and base 711, respectively. In an embodiment, the attachment regions 707b, 717b are both substantially flat. In an embodiment, the attachment regions 707b, 717b have complementary shapes (e.g., a protruding shape and a complementary recessed shape). Similarly, an attachment region 717c at an opposite side of the assembly base 711 may be attached to an attachment region 807b at a side of the controller 801, via respective magnets 808b, 718c in the controller 801 and the assembly base 711, respectively.

The handheld controllers 701, 801 and the assembly base 711 may be detachable from each other, such as through being pulled apart. In an embodiment, one or more of the magnets in the assembly 800 may be deactivated, wherein this deactivation may need to be performed before the handheld controllers 701, 801 and the assembly base 711 can be detached from each other. For example, the magnets in the assembly 800 may be electromagnets that are able to be deactivated. In such an embodiment, the electromagnet may be deactivated by ceasing power to the electromagnet.

In an embodiment, at least one of the first handheld controller 701, the second handheld controller 801, and the assembly base 711 may be configured to generate a haptic effect utilizing at least one of the magnets 708a, 708b, 808a, 808b, and 718a-718c. In one example, the magnets can generate a haptic effect by varying magnetic strength of two magnets on two respective handheld controllers, or on a respective handheld controller and a respective assembly base, to make the two objects harder or easier to pull apart. For instance, if the magnets were electromagnets, their magnetic strength may be varied by varying a current that is applied to the electromagnets. In another example, the magnets can create a haptic effect by varying magnetic strength by varying magnetic strength of two magnets on two respective handheld controllers, or on a respective handheld controller and respective assembly base, as the user is moving the two objects relative to each other.

FIG. 17 shows another embodiment in which one or more handheld controllers and one or more assembly bases can be attached to form a modular peripheral device assembly 900. The peripheral device assembly 900 may include the handheld controllers 701, 801, and assembly base 711, as shown in FIG. 16, and further include a second assembly base 911. The second assembly base 911 may be included in the peripheral device assembly 900 to increase the width of the assembly 900 (as compared to peripheral device assembly 800) for a two-handed game controller. In FIG. 17, the second assembly base 911 includes one or more attachment regions and one or more respective magnets at those regions. The attachment regions include attachment regions 917a, 917b, and 917c. The magnets include magnets 918a, 918b, and 918c at the respective attachment regions. In FIG. 17, the attachment region 917a and magnet 918a may be used for attachment with an attachment region 707a or 807a of the handheld controller 701 and 801, respectively.

Further in FIG. 17, the attachment regions 917b and 917c may be at opposite sides of the second assembly base 911. The respective magnets 918b and 918c may also be at opposite sides of the second assembly base 911. In an embodiment, the attachment region 707b at a side of the handheld controller 701 is attachable to an attachment region 717b at a first side of the first assembly base 711, in a similar manner as shown and described with reference to FIG. 16. Further, an attachment region 717c at a second, opposite side of the first assembly base 711 may be attachable to an attachment region 917b at a first side of the second assembly base 911. Additionally, an attachment region 917c at a second, opposite side of the second assembly base 911 may be attachable to an attachment region 807b at a side of the second handheld controller 801. The attachment in FIG. 17 may be performed using magnets 708b, 718b, 718c, 918b, 918c, and 808b.

Figure 18:
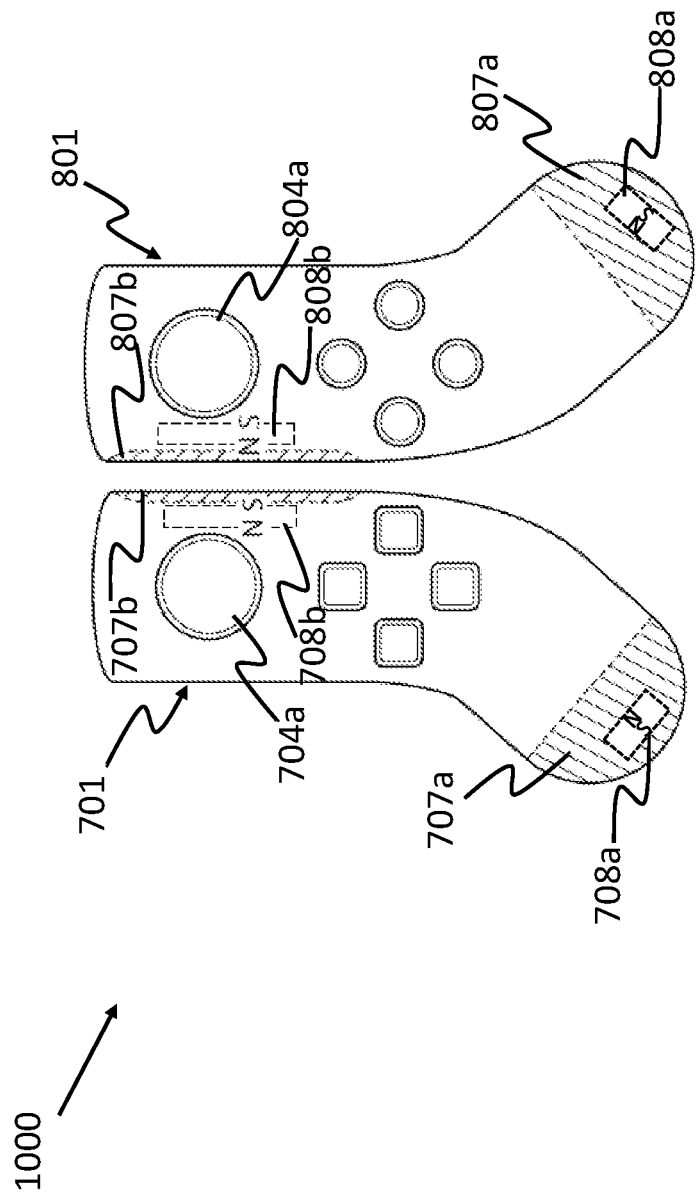

In other embodiments, a peripheral device assembly may include more (e.g., three) or fewer assembly bases. For example, FIG. 18 shows a peripheral device assembly 1000 that has no assembly base. In FIG. 18, the peripheral device assembly 1000 includes only the handheld controller 701 and the handheld controller 801, which may be magnetically attached at an attachment region 707b and 807b of the respective handheld controllers. The magnetic attachment may be accomplished using magnets 708b and 808b of the respective handheld controllers.

In an embodiment, peripheral device assemblies 700-1000 may include a control unit for controlling one or more haptic effects, such as control unit 120. The control unit may control the haptic effects, including what type of haptic effect to generate, an output intensity of the haptic effect, and/or which haptic actuators to use to generate the haptic effect. The control unit may control the haptic effects based on the techniques discussed above with respect to FIGS. 1-12. For example, it may control the haptic effects based on whether the handheld controller 701, 801 is/are attached to the assembly base 711, or whether the handheld controller 701, 801 is/are detached from the assembly base 711, and/or based on an application event associated with the haptic effect.

As discussed above, the assembly base 711 may include one or more hooks 715a-715d that can be used for a wearables application. FIGS. 19A and 19B illustrate straps being attached to the hooks 715a-715d for wearables applications. FIG. 19A shows the assembly base 711 being hooked to a wrist strap, which may be attached to a user's wrist. FIG. 19B shows the assembly base 711 being hooked to a longer strap which may be attached around a user's thigh, for instance. Both wearables straps may provide, e.g., greater portability of the peripheral device assembly, by making it easier for a user to move with or to transport the peripheral device assembly.

In an embodiment, an assembly base may be included as part of a glove. The attachment component for this assembly base may be attached to a surface of a palm portion of the glove, or attached to a surface on the other side of the glove. This configuration may allow a user to wear the glove on one hand (e.g., left hand), and attach a handheld controller with an attachment component on the glove. The user may then use the other hand (e.g., right hand) to control the handheld controller, e.g., as a joystick.

In an embodiment, the magnets discussed herein may be used to approximate the distance between two components (e.g., between a handheld controller and an assembly base) before the two components are attached to each other. In an embodiment, the magnets may be part of a hall effect sensor used to detect proximity between the two components.

In an embodiment, software may be used to customize inputs/haptic preferences. In an embodiment, one or more of the handheld controllers and/or assembly bases described herein may include a touch screen or other display element.

Embodiments hereof may be adapted for use in various hardware and system interface to include a set of connection or interface points into a haptic environment, e.g., input/output, function calls, libraries such as DLLs, etc. Various control units described herein may include a microprocessor, FPGA, PGA, or any combination thereof. The microprocessor may execute one or more computer-readable instructions stored on a non-transitory computer-readable medium.

Embodiments may be referred to as modular haptic peripheral device assembly and/or a buildable haptic controller.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A modular peripheral device assembly configured to generate a haptic effect, wherein the haptic effect is associated with an event in an application receiving input from the modular peripheral device assembly, the assembly comprising:
a handheld controller configured to sense at least one of motion or orientation of the handheld controller, wherein the handheld controller includes,
a user input component,
a sensor configured to track at least one of motion or orientation of the handheld controller, and
a first haptic actuator or a first set of haptic actuators configured, when activated, to generate the haptic effect at the handheld controller;
an assembly base that includes,
an attachment component that is configured to be attachable to and detachable from the handheld controller, and
a second haptic actuator or a second set of haptic actuators configured, when activated, to generate the haptic effect at the assembly base or, when the handheld controller is attached to the attachment component, at the handheld controller; and
a control unit located in at least one of the handheld controller or the assembly base, and configured,
in response to a determination that the handheld controller is attached to the assembly base and that the haptic effect is associated with a first type of event in the application: to select the second haptic actuator or the second set of haptic actuators to generate the haptic effect, and to activate the second haptic actuator or the second set of haptic actuators to generate the haptic effect, in response to a determination that the handheld controller is attached to the assembly base and the haptic effect is associated with a second type of event in the application: to select the first haptic actuator or the first set of haptic actuators to generate the haptic effect, and to activate the first haptic actuator or the first set of haptic actuators to generate the haptic effect, and in response to a determination that the handheld controller is detached from the assembly base, to select only the first haptic actuator or only the first set of haptic actuators to generate the haptic effect, and to activate only the first haptic actuator or only the first set of haptic actuators to generate the haptic effect.

2. The modular peripheral device assembly of claim 1, wherein the attachment component of the assembly base includes a sleeve having a first groove and a ball extendable from the first groove, wherein the handheld controller has a second groove, and wherein the ball is configured to extend from the first groove to the second groove to lock the handheld controller to the assembly base when the two grooves are aligned.

3. The modular peripheral device assembly of claim 1, wherein the assembly base includes a strap configured for attachment to a user's body.

4. The modular peripheral device assembly of claim 1, wherein the assembly is configured to provide input to a virtual reality (VR) or augmented reality (AR) application.

5. The modular peripheral device assembly of claim 1, wherein the attachment component is configured to be attachable to and detachable from an end of the handheld controller, and wherein the handheld controller is pivotable about the assembly base when attached thereto, such that the peripheral device assembly is operable as a joystick when the handheld controller is attached to the assembly base, and wherein the second haptic actuator or the second set of haptic actuators, when activated, are configured to generate a kinesthetic haptic effect on the joystick when the handheld controller is attached to the assembly base.

6. The modular peripheral device assembly of claim 5, wherein the attachment component comprises a gimbal configured to provide at least two degrees of freedom, and the second haptic actuator is configured to exert a force or torque on the handheld controller via the attachment component.

7. The modular peripheral device assembly of claim 1, wherein the control unit is configured to select only the first haptic actuator to generate the haptic effect in response to determining that the handheld controller is detached from the assembly base.

8. The modular peripheral device assembly of claim 7, wherein the control unit is configured to
i) select only the second haptic actuator or only the second set of haptic actuators to generate the haptic effect in response to determining that the handheld controller is attached to the assembly base and that the haptic effect is associated with the first type of event in the application, and
ii) select only the first haptic actuator or only the first set of haptic actuators to generate the haptic effect in response to determining that the handheld controller is attached to the assembly base and that the haptic effect is associated with the second type of event in the application.

9. The modular peripheral device assembly of claim 7, wherein, in response to a determination that the handheld controller is attached to the assembly base and the haptic effect is associated with the first type of event in the application, the control unit is configured to also select the first haptic actuator to generate the haptic effect if device profile information stored on the modular peripheral device assembly indicates that an output intensity of the first haptic actuator is less than a programmed threshold.

10. The modular peripheral device assembly of claim 7, wherein, in response to a determination that the handheld controller is attached to the assembly base and that the haptic effect is associated with the first type of event in the application, the control unit is configured to also select the first haptic actuator to generate the haptic effect, but is configured to delay activation of the first haptic actuator relative to activation of the second haptic actuator.

11. The modular peripheral device assembly of claim 1, wherein the handheld controller is a first handheld controller, the assembly further comprising a second handheld controller having another attachment component that is attachable to and detachable from an opposite end of the first handheld controller, the second handheld controller further comprising a third haptic actuator.

12. The modular peripheral device assembly of claim 11, wherein when the first handheld controller is attached to the assembly base and is not attached to the second handheld controller, and the haptic effect is associated with the first type of event in the application, the control unit is configured to activate the second haptic actuator with a first level of output intensity to generate the haptic effect.

13. The modular peripheral device assembly of claim 12, wherein, when the first handheld controller is attached to the assembly base and to the second handheld controller, and the haptic effect is associated with the first type of event in the application, the control unit is configured to activate the second haptic actuator with a second level of output intensity to generate the haptic effect or to activate the third haptic actuator with the second level of output intensity, the second level of output intensity being higher than the first level of output intensity.

14. The modular peripheral device assembly of claim 13, wherein the first handheld controller is configured as a one-handed controller, the second handheld controller is configured as a two-handed controller.

15. The modular peripheral device assembly of claim 11, wherein when the first handheld controller is attached to the assembly base and is not attached to the second handheld controller, and the haptic effect is associated with the second type of event in the application, the control unit is configured to select the first haptic actuator, and to select no actuator of the second handheld controller to generate the haptic effect.

16. A method of generating haptic effects in a modular peripheral device assembly that includes i) a handheld controller configured to sense at least one of motion or orientation of the handheld controller and having a first haptic actuator or first set of haptic actuators configured, when activated, to generate the haptic effects at the handheld controller, ii) an assembly base that is attachable to and detachable from an end of the handheld controller and that has a second haptic actuator or second set of haptic actuators, wherein the handheld controller is pivotable about the assembly base when attached thereto, such that the modular peripheral device assembly is operable as a joystick when the handheld controller is attached to the assembly base, and wherein the second haptic actuator or second set of haptic actuators, when activated, are configured to generate a kinesthetic haptic effect on the joystick when the handheld controller is attached to the assembly base, and iii) a control unit located in at least one of the handheld controller or the assembly base, the method comprising:

the control unit determining that a first haptic effect needs to be generated for an application receiving input from the peripheral device assembly and determining that the handheld controller is attached to the assembly base;

the control unit selecting, in response to determining that the handheld controller is attached to the assembly base, the second haptic actuator or second set of haptic actuators to generate the first haptic effect as the kinesthetic haptic effect on the joystick;

the control unit activating the second haptic actuator or the second set of haptic actuators to generate the kinesthetic haptic effect;

the control unit determining that a second haptic effect needs to be generated and determining that the handheld controller is detached from the assembly base; and the control unit selecting, in response to determining that the handheld controller is detached from the assembly base, only the first haptic actuator or only the first set of haptic actuators to generate the second haptic effect; and the control unit activating only the first haptic actuator or only the first set of haptic actuators to generate the second haptic effect.

17. The method of claim 16, wherein the step of selecting the second haptic actuator or the second set of haptic actuators comprises selecting only the second haptic actuator or only the second set of haptic actuators to generate the first haptic effect.

\* \* \* \* \*